United States Patent [19]

Mumford

[11] Patent Number: 5,321,807
[45] Date of Patent: Jun. 14, 1994

[54] ACCELERATED GRAPHICS DISPLAY METHOD

[76] Inventor: Christopher J. Mumford, 6565 McCallum #324, Dallas, Tex. 75252

[21] Appl. No.: 798,900

[22] Filed: Nov. 27, 1991

[51] Int. Cl.$^5$ ............................................. G06F 15/20
[52] U.S. Cl. .................................. 395/162; 395/157; 395/164; 345/201; 345/120
[58] Field of Search .............. 395/134, 133, 157, 162, 395/164–166, 375, 650; 340/724, 723, 798–799; 345/118–120, 189, 201, 191, 185

[56] References Cited

U.S. PATENT DOCUMENTS 5,146,558  9/1992  Inoue ................................... 395/166
5,146,592  9/1992  Pfeiffer et al. ....................... 395/164

OTHER PUBLICATIONS

Michael Lesk, "Special Section: Digital Imagery, Preservation, and Access," *Information Technology and Libraries*, 9(4):300–308 (Dec. 1990).
Vortech Data, Inc., "Vortech Personal Display System Product Specification," Jun. 27, 1990, Part No. 090-00001-010-A, Version 1.0.
Vortech Data, Inc., "Image Archival and Retrieval System Functional Specification and High Level Design," Jan. 19, 1989, 291-0006-011-A.
Laura Souhrada, "Toshiba pursues PACS research into the 1990s," *Hospitals*, p. 47 (Apr. 5, 1990).
Laura Brennan, "IBM Ready for Imaging Market with Optical-Storage System," *PC Week*, 5:8 (Jun. 14, 1988).
Dave Bursky, "Optical Disk Drives Tackle All Needs," *Electronic Design*, p. 57 (Oct. 26, 1989).
Brochure "The Path is Clear. Vortech & Kodak.".
D. H. Davies, "The CD-ROM Medium," *Journal of the American Society for Information Science*, 39:34 (Jan. 1988).
E. M. Cichocki and S. M. Ziemer, "Design Considerations for CD-ROM Retrieval Software," *Journal of the American Society for Information Science*, 39:43 (Jan. 1988).

"Optical's Vast Expanses," *PC Week*, 5:S17 (Mar. 15, 1988).
J. Pournelle, "Jukebox Computing: A Sextet of CD-ROMs On-Line Makes for Lively Computing," *Byte*, 16:73 (Jan. 1991).
A. Radding, "Storage Technologies: Putting Data in its Proper Place," *Computerworld*, 24:61 (Aug. 13, 1990).

*Primary Examiner*—Dale M. Shaw
*Assistant Examiner*—Kee M. Tung
*Attorney, Agent, or Firm*—G. Michael Roebuck

[57]   ABSTRACT

A method is presented which eliminates the extra steps by an application to call a graphics function. The method eliminates the intercepting layer or program between the application and the graphic functions. The method may call hardware and software graphics functions directly and thus requires fewer processing steps and thereby reduces the amount of work the host computer must perform. The method and apparatus enables copy image data into a computer screen window faster than a comparable image display system that intercepts every call that an application makes to a graphics function.

The method and apparatus enables an application program to directly control the location of image data in memory. The present invention enables movement of image data within memory or out of memory to make room for higher priority images. These features enable an application program to move image data between memories for different displays so that an image can move between screens.

The method and apparatus enables display of images that are too large to fit on a single display memory to be broken into smaller sections referred to as "chunks". Each image chunk is small enough to fit within a single display memory so that large images can be displayed by writing each smaller chunk to a single display memory and then displaying all the chunks together and so that the entire image appears on the display screen.

20 Claims, 10 Drawing Sheets

Figure #1

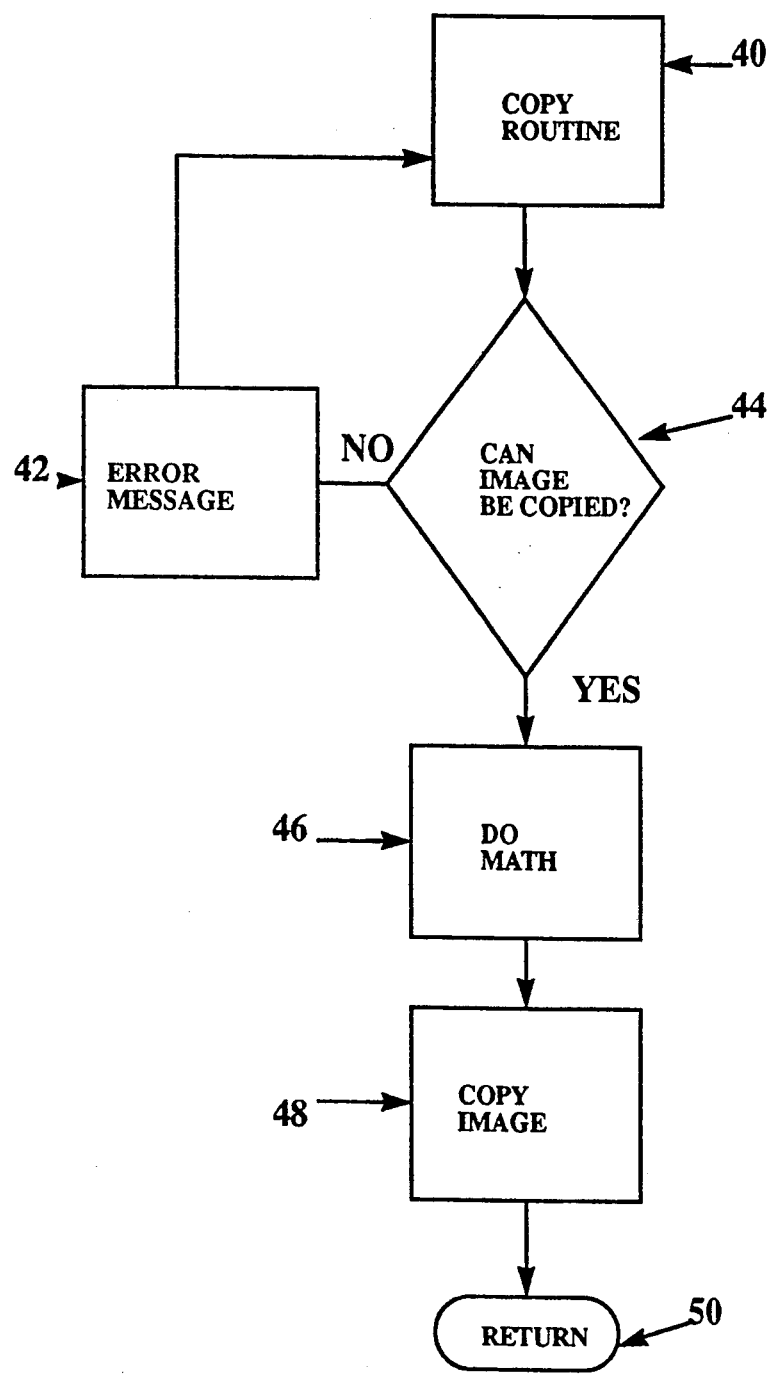
FIGURE # 3

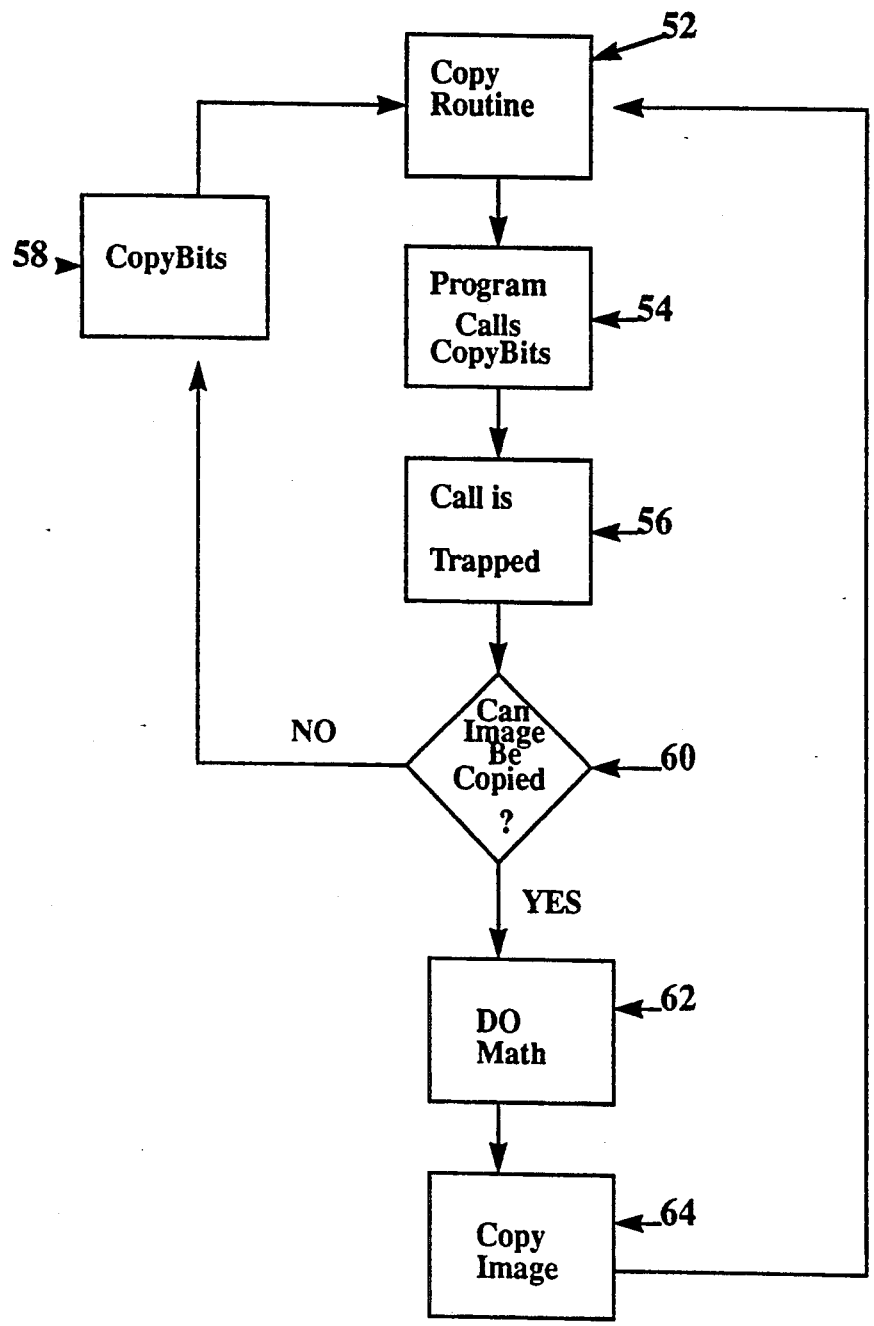
FIGURE # 4

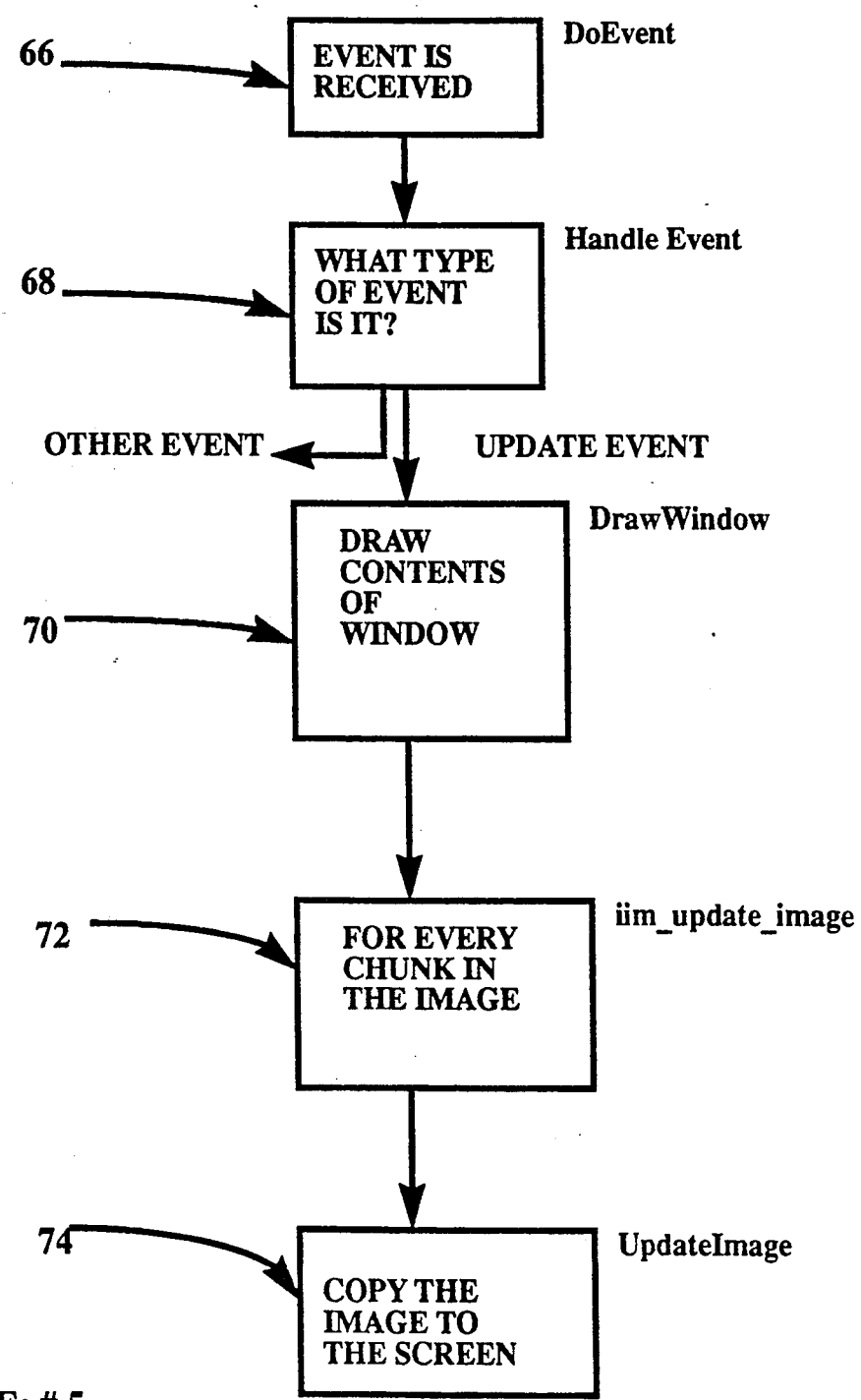
FIGURE: # 5

SOURCE RECTANGLE
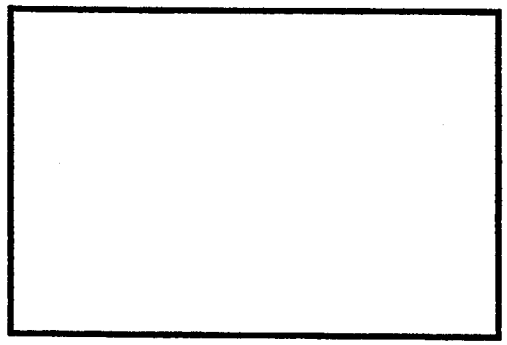
500
DESTINATION RECTANGLE
ZOOM = 1
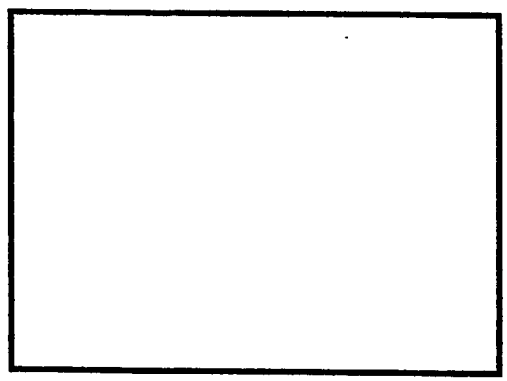
510
WINDOW
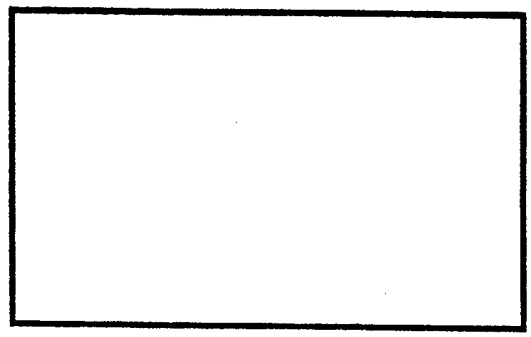
520
FIGURE # 6A

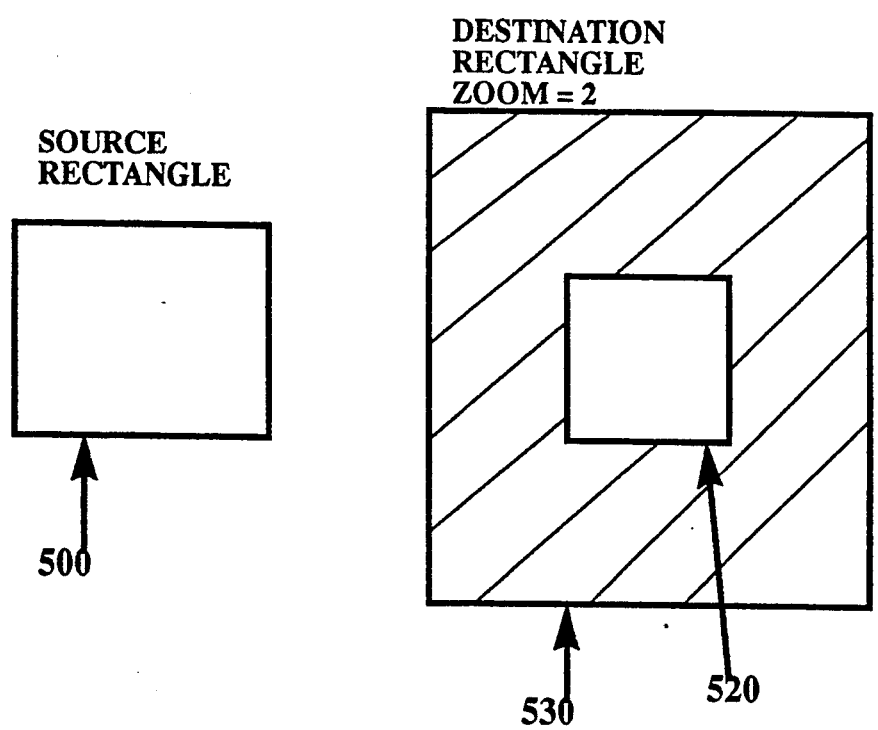
FIGURE # 6B

FIGURE # 7
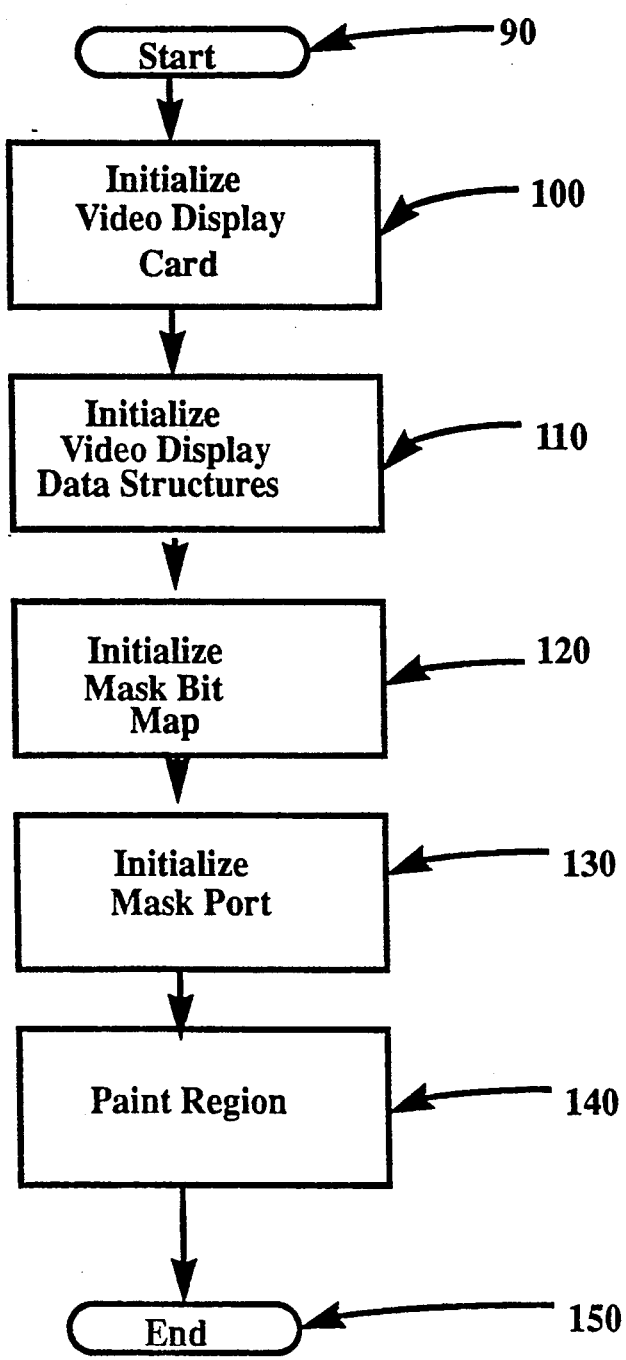

FIGURE # 8
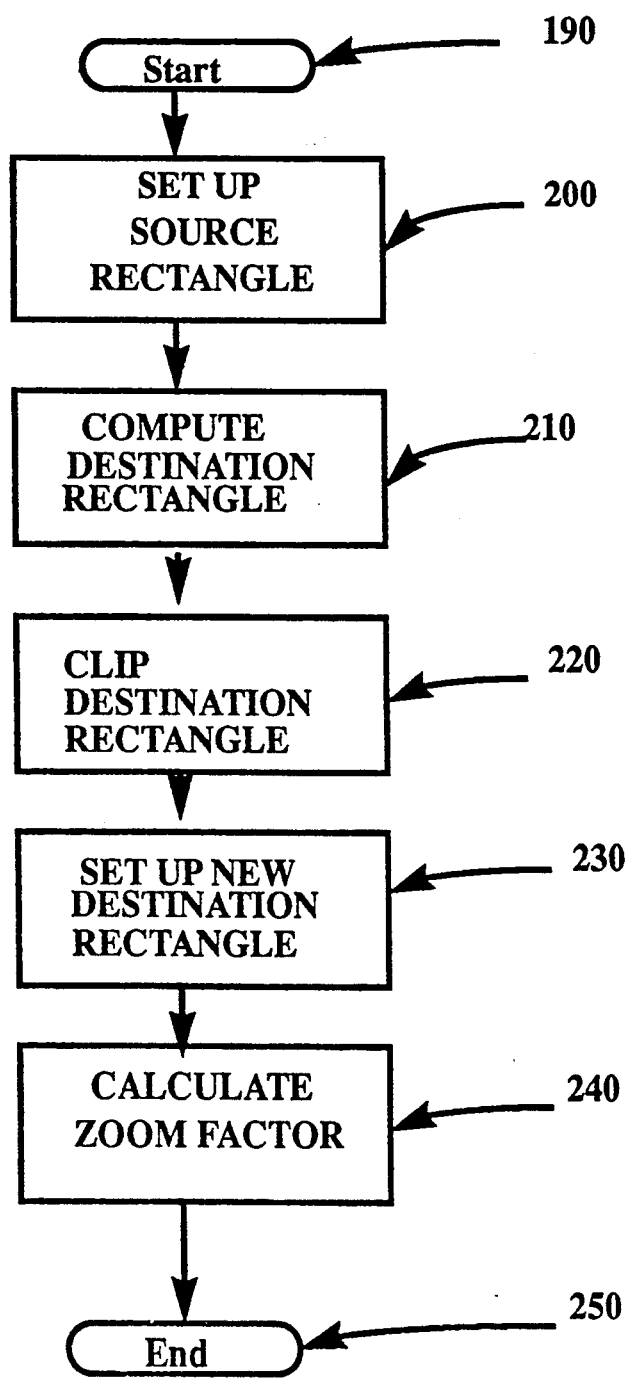

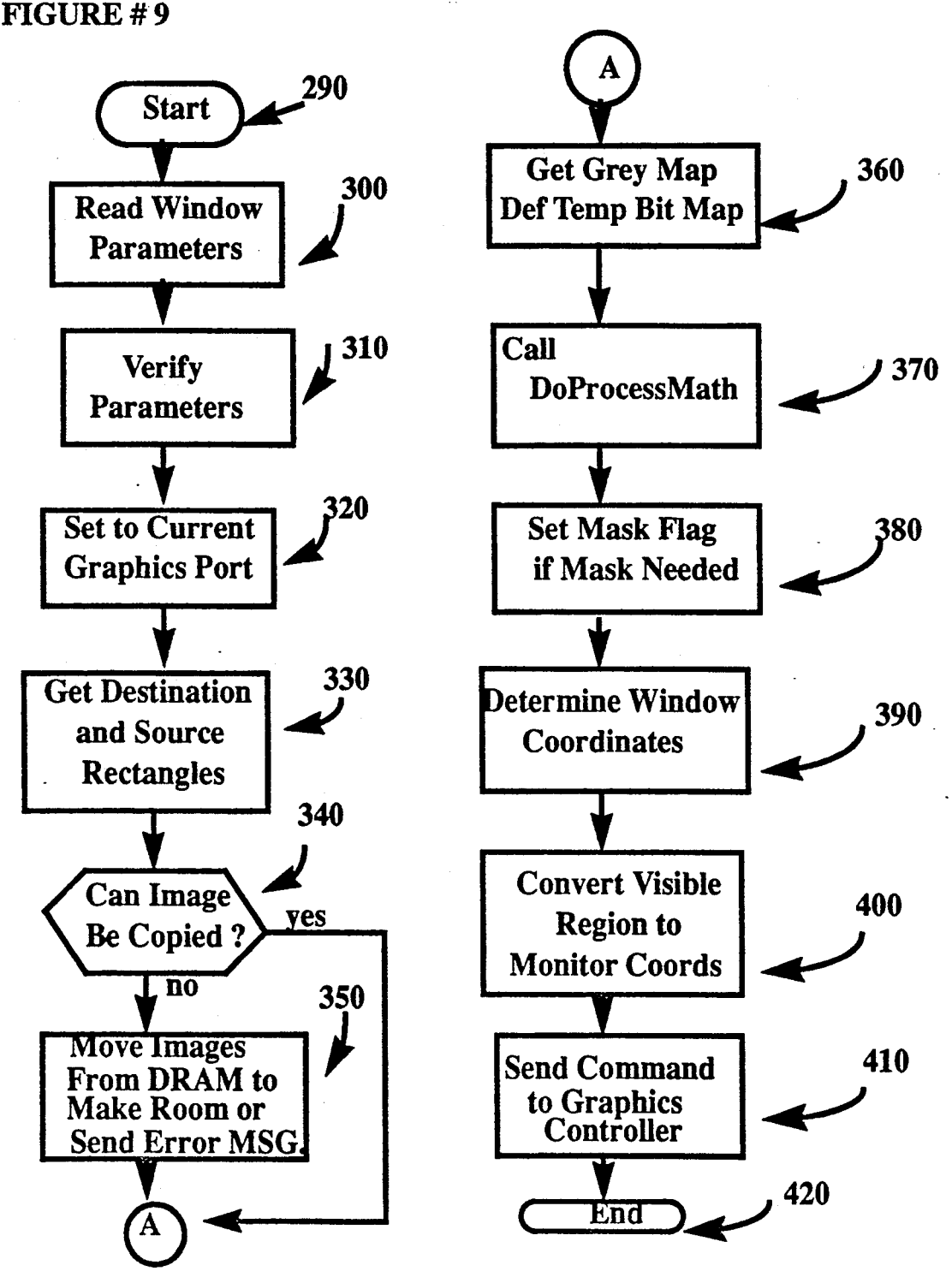
FIGURE # 9

ACCELERATED GRAPHICS DISPLAY METHOD

TABLE OF CONTENTS

BACKGROUND OF THE INVENTION
SUMMARY OF THE INVENTION
BRIEF DESCRIPTION OF THE DRAWINGS
DETAILED DESCRIPTION OF A PREFERRED EMBODIMENT
    HARDWARE ENVIRONMENT FOR A PREFERRED EMBODIMENT
    SOFTWARE ENVIRONMENT FOR A PREFERRED EMBODIMENT
    THE GRAPHICS APPLICATION PROCEDURE OF THE PRESENT INVENTION
    SOFTWARE FUNCTIONS USED BY THE PRESENT INVENTION
    HANDLING AN UPDATE IMAGE REQUEST
    COMMANDING DISPLAY OF AN IMAGE
CLAIMS
ABSTRACT OF THE INVENTION
APPENDIX—SOFTWARE LISTINGS AND COMMENTS

BACKGROUND OF THE INVENTION

1. Field of the Invention

This invention relates to a method for commanding a dedicated graphics controller to display image data inside of a window on a computer display screen. More specifically, the invention relates to a method of sending commands directly from a host computer application program to a dedicated graphics controller. The host computer application prepares the image data and passes a copy command to an external dedicated graphics controller to display the image data. The external graphics controller copies the image data to video display memory so that the image appears in a computer screen window. The invention is directed to the problem of reducing the amount of time it takes to display an image in a window on a computer display.

2. Description of the Related Art

Image display systems utilizing windows on a computer screen are well known in the art. These image display systems use various combinations of graphics functions implemented in hardware and software to display image data on a computer screen. Hardware and software implementations of graphics functions are well known in the art. A well known software graphics package is the Macintosh graphics package. A well known hardware graphics implementation is the Raster OPS Display Board.

Graphics hardware is much faster than graphics software because the hardware is usually dedicated and designed to run graphics only. The software, however, runs on a host computer and shares computer processing time with all the other applications that run on the host computer. These other host applications are chores that the host computer must maintain, such as keeping track of keyboard input and reading data from disk. The graphics response time suffers as a result of this time sharing in a software implementation of a graphics function.

Vendors have turned to hardware graphics functions to speed up their image display systems. The hybrid systems use a combination of hardware and software graphics functions, and are therefore faster than the systems that use software only. These hybrid systems typically intercept requests or calls to graphics functions and then decide whether to use the hardware or the software to carry out the requested graphics function.

Developers typically have chosen to implement these hybrid systems as transparent systems. In a transparent system, an application program can not detect the presence of the graphics hardware when it calls a graphics function. The hybrid systems, of course, run faster than the software only systems and because the hybrid systems are transparent, they can run the same application code that was written for the software only systems. This means you do not have to write new software to move from a software only system to a hybrid system. Therefore, these transparent systems are attractive to some users. However, transparency can create problems as well.

In order to appear transparent to an application running on a host computer, hybrid image display systems typically trap or intercept an application program's calls to graphics functions. The hybrid system then decides whether to process the call with a hardware or a software graphics function. This creates a problem. Trapping or intercepting function calls means that there are extra steps involved in processing a function call and therefore there is more work for the host computer to perform.

These extra steps effectively create an extra layer of decision making between the requesting application and the graphics functions. Extra steps are required to trap the graphics function calls and extra steps are required to decide how to process each one of them. There are extra steps required to call the hardware and extra steps required to call the software. This means additional overhead for each and every graphics request, even those requests that do not use the hardware. The cumulative result of trapping on every graphics function call is a degradation of the system response time for the image display system. These transparent systems actually slow down the system response time to some degree while trying to speed the system up.

Transparent hybrid systems also inhibit an application program's direct control over the location of image data. Transparent systems typically run with applications that utilize a high level graphics command language like the Macintosh graphics package. These high level commands do not inform an application as to the specific location of image data in memory. Therefore, an application using these high level graphics functions cannot effectively manage the location of image data in memory. This problem typically presents itself in multimonitor implementations.

SUMMARY OF THE INVENTION

The present invention addresses the shortcomings of the systems described above. The present invention does not require extra steps for an application to call a graphics function. Therefore, there is no intercepting layer or program between the application and the graphic functions. The present invention allows the application to call hardware and software graphics functions directly and thus requires fewer processing steps. The present invention thus reduces the amount of Work the host computer must perform. The present invention can therefore copy image data into a computer screen window faster than a comparable image display system that intercepts every call an application makes to a graphics function.

Another advantage of the present invention is its ability to directly control the location of image data in memory. The present invention enables an application program to locate image data in memory. Therefore, an application program can manage the movement of images. The present invention can move image data within memory, into memory or out of memory to make room for higher priority images. These features enable an application program to move image data between memories for different displays so that an image can move between screens.

The present invention also allows images that are too large to fit on a single display memory to be broken into sections called chunks. Each chunk is small enough to fit on a single display memory so that these large images can be displayed by writing each chunk to a single display memory and then displaying all the chunks together and so that the entire image appears on the display screen.

BRIEF DESCRIPTION OF THE DRAWINGS

FIG. 3 is a process flow diagram for a procedure executed by an application program running on a host computer in the system of FIG. 1 representing one aspect of the invention that is executed in response to a request to update an image data in a window on a computer screen.

FIG. 4 is a process flow diagram for a transparent hybrid image display system executing a graphics processing request issued from an application running on the hybrid image display system's host computer.

FIG. 5 is a process flow diagram for a procedure executed in one aspect of the present invention by an application program running on a host computer in response the reception of an event generated by a user input to the host computer.

FIGS. 6A and 6B are block diagrams showing how image data in a source rectangle is zoomed and clipped to fit in a window in one example of a preferred embodiment.

FIG. 7 is a flow chart for a software program executed in one example of a preferred embodiment of the present invention.

FIG. 8 is a flow chart for a software program executed in one example of a preferred embodiment of the present invention.

FIG. 9 is a flow chart for a software program executed in one embodiment of a preferred embodiment of the present invention.

DETAILED DESCRIPTION OF A PREFERRED EMBODIMENT

Hardware Environment for a Preferred Embodiment

Figure 1:
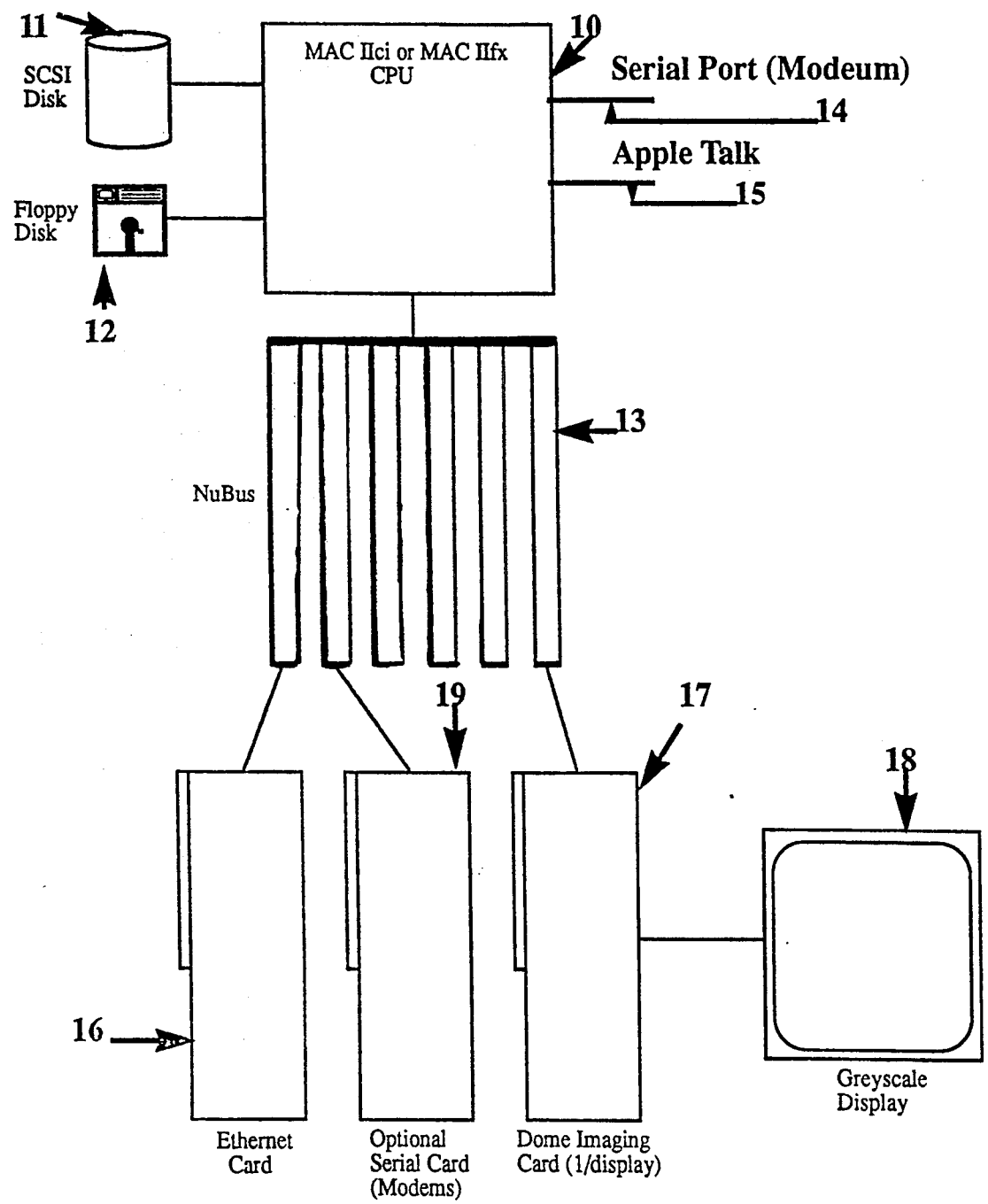
FIG. 1 is a block diagram of an video image display system incorporating one example of a preferred embodiment of the present invention.

FIG. 1 is a block diagram of an video image display system incorporating an hardware environment in which on example of a preferred embodiment of the present invention may reside. In the preferred embodiment this hardware environment is typically a Personal Display System (PDS) by Vortech Data, Inc. of Richardson, Tex.

The major components of this environment are: a MACII fx or ci computer 10, a Small Computer System Interface (SCSI) Disk 11, Floppy Disk 12, a MacIntosh NuBus 13, a Serial Port 14 (for Modem Applications), an AppleTalk Port 15, an Ethernet Interface Card 16, an Imaging processor Card 17, a Greyscale Display 18 and an Optional Serial Card 19 (Multi-Modem Applications).

The MACII family of work stations acts as the host computer for applications programs. The MACII architecture lends itself to most image manipulation and display applications, given its high performance (1.5 to 20 million instructions per second (MIPS) depending on the model) and an open design (NuBus).

In the preferred embodiment of the present invention, the system bus 13 will be the NuBus. A high-performance ethernet controller 16 provides a basic connectivity with the Medical Imaging Gateway (MIG) for the reception of image data.

The preferred embodiment utilizes a Dome Macintosh Imaging Display Board 17 for each dedicated display in the system. This is a 10 Mhz, 32-bit, TI TMS 34020-based specialized image processor. The preferred embodiment supports up to 6 high-resolution displays 18.

Software Environment for a Preferred Embodiment

The software environment of one example of a preferred embodiment, is the Macintosh operating system (6.0) which provides the host environment for applications running on the Mac-based work stations where imagery is viewed. The preferred embodiment includes a local database that provides accessibility and organization of image and report files by the user.

In a preferred embodiment of the present invention, image presentation features include: display inside windows with normal window-based operations (open, close, etc.) and image organization as it pertains to the number and composition of each window.

In the preferred embodiment, operations on window-based data conform to the Macintosh toolbox or palette implementation. Window and level manipulation as well as zooming is done using a mouse or track ball.

The Graphics Application Procedure of the Present Invention

The present invention runs as a graphics application on a host computer. The host computer is a Macintosh in one example of a preferred embodiment. In a preferred embodiment, the Macintosh generates an update image event in response to user input. The user initiates an input, typically via a mouse or track ball attached to the host computer, to request the application to send image data to a window on the computer display screen. The present invention receives the update image event and prepares the image data for processing by an external dedicated hardware graphics controller. Once the present invention has prepared the image data, it sends a command directly to the graphics controller. The graphics controller then copies the image data into display memory so that the imagery appears in the window on the computer display screen.

Visible Region of a Window

Figure 2:
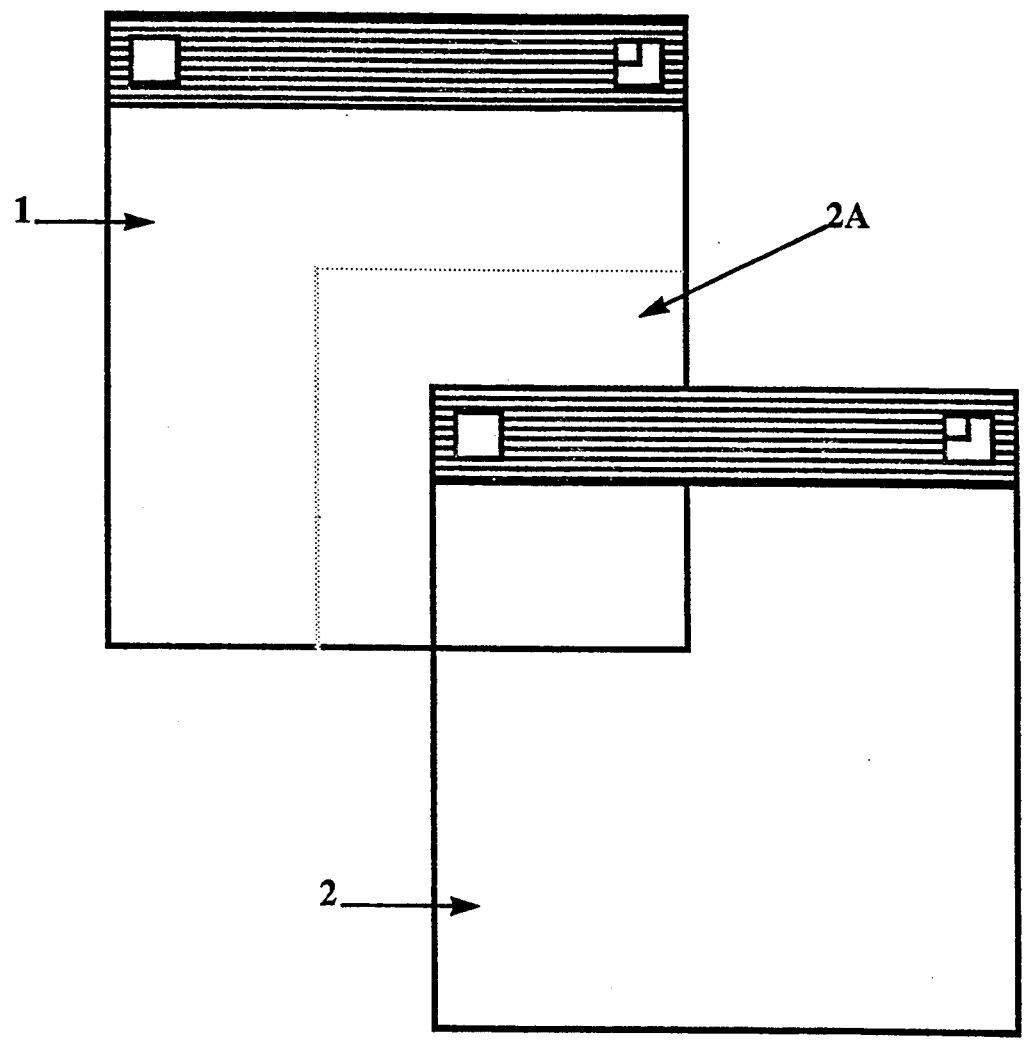
FIG. 2 is schematic representation of the visible regions of two computer display windows that show in an overlaid configuration and then moved on a display screen in one example of a preferred embodiment of the present invention.

Referring to FIG. 2, window 1, window 2 and window 2a are shown as they might appear in an overlaid configuration on a computer display screen. In the example shown in FIG. 2, window 2 is on top of window 1. Window 2 has been dragged in response to a user input via a mouse or track ball from its initial position 2a. As window z moves it uncovers a portion of window 1. Window 1 therefore must be updated, that is, image data written into this previously covered, newly visible portion of window 1.

The present invention creates a bit map to keep track of the visible region of window 1. The bit map is necessary so that only the visible region of window 1 will be updated. Writing the entire block of data for window 1 would result in writing data over window 2. The present invention commands the external dedicated graphics processor, a Dome Image Display Board (Dome Board) in the preferred embodiment, to copy image data corresponding to the visible region of window 1. The Dome Board uses the bit map to determine the Visible region of the window it is updating. In FIG. 2, the visible region of window 1 corresponds to that portion of window 1 that was previously visible plus that portion of window 1 that was uncovered by moving window 2 from its original position 2a.

The present invention relies on the graphics routines resident in the host computer to keep track of the visible regions of the windows. When a window needs to be updated, the present invention requests a host graphics routine to copy the visible region into the mask bit map, thus creating a mask bit map corresponding to the visible region of the window that will receive the image data, i.e., the target window. Each display has an off-screen memory and an on-screen memory which contain image data. Only the data that is written to the on-screen display memory appears on the display. In a preferred embodiment off-screen memory comprises the Dome Board's Dynamic Ram (DRAM) and the on-screen memory comprises the Dome Board's video ram (VRAM).

In FIG. 2 the lower right portion of the visible region and thus the bit map looks like an "L" rotated 90 degrees. To update Window 1, the preferred embodiment of the present invention the graphics controller will copy a pixel to the window on the display screen only if there is a corresponding pixel set in the mask bit map, corresponding to the visible region of the window. This mask bit map ensures that writing data to window 1 on the screen will not write on top of Window 2. The portion of Window 1 that is under Window 2, therefore, is not brought forward, or written to the computer screen window.

Software Functions used by the Present Invention

In the preferred embodiment the present invention uses four software routes, LoadDeviceConfig, DoProcessMath, UpdateImage and PsuedoCopyBits. A complete source code listing with comments appears in the appendix. The source code is written in the "C" programming language.

LoadDeviceConfig

Referring to FIG. 7, the LoadDeviceConfig route in called once when the preferred embodiment of the present invention is initialized as an application in the host computer. In the preferred embodiment, LoadDeviceConfig initializes 100 the video display cards 17 and their respective data structures 110, which includes allocating the mask bit map 120 via the SetupMaskBit procedure, and loads the Dome Operating System. SetupMaskBit allocates a mask bit map 130 the same height and width in pixels as the video display (having a bit for each pixel of the display) and one-bit-deep. LoadDeviceConfig then calls InitMaskPort to initialize a Macintosh graphics port structure, which defined the bit map and sets up a mask region and mask port for each video display. In a preferred embodiment, the present invention calls the Macintosh function PaintRegion 140 to set and clear pixels in the mask bit map to duplicate the visible region of a given window. The procedure then ends 150.

UpdateImage

Referring to FIG. 5, the present invention calls a copy image data routine in response to an update window request. In a preferred embodiment, the invention calls the DrawWindow routine when an application receives an Update Image Event from the Macintosh operating system. Referring now to FIG. 8, DrawWindow calls the UpdateImage route 290 and passes image data locations in DRAM. The host computer handles the initial transfers of image data from system memory to DRAM. There are three parameters passed to UpdateImage: chunkRect (when a image is divided into sections, this parameter is a description of which section or "chunk" of an image will now be written to the window. ChunkRect consists of 4 integers corresponding to the pixel coordinates of the top, left, right and bottom corners of the Source rectangle, or image chunk in DRAM); IIM_IMG_INFO (a data structure that contains among other things, the address of the image data in DRAM, Image ID and Image Size); and IMAGE_CHUNK_POINTER (a pointer to a structure named "theChunk" which contains a pointer to the image data for this chunk). UpdateImage gets a pointer to the graphics word or "Gworld" (an off-screen bit map of the images), and then makes sure the image is loaded into DRAM. UpdateImage then reads the parameters 300 and verifies them 300. It then sets up the graphics port to the current window 320.

Some of the parameters pertain to the destination rectangle 330, the rectangle that the image will be copied into. When an image is zoomed the destination rectangle expands. For instance, if the zoom factor equals 2, then the destination rectangle is twice as large as the image and the image window. The destination rectangle will be clipped to fit inside the window when it becomes larger than the window.

Referring to FIG. 6A, in a preferred embodiment, the present invention deals with three rectangles. The source rectangle 500 is the size of the image, the window rectangle 520 is the size of the window, and the third window is the destination rectangle 510, which has no bearing on the size of the image displayed. For example, as in FIG. 6A, when an image is 100 pixels wide×100 pixels tall, and the window 520 is 100×100 pixels, and the destination rectangle 510 is 100×100 when the zoom factor is 1. The corner coordinates of the destination rectangle are 0 left, 0 top, 100 right and 100 bottom. Referring to FIG. 6B, if you zoom into the center of the image and magnify it by a factor of 2 (zoom factor equals 1) the destination rectangle 530 expands to 200 pixels wide×200 pixels tall. The corner coordinates of the destination rectangle are now −50 left, −50 top, 150 right and 150 bottom. This expansion increases the number of pixels by bilinear mathematical averaging for smoother pixels or by pixel replication which is faster.

Still referring to FIG. 6B, the corner coordinates of destination rectangle 530, dRect are now (−50 left, −50 top, 150 right, 150 bottom). The corner coordinates source rectangle 500, sRect, are (0 left, 0 top, 100 right, 100 bottom). The window rectangle 510, WindowRect is set equal to sRect, so that the coordinates of the window are (0 left, 0 top, 100 right, 100 bottom) for clipping purposes. The destination rectangle 530 is now larger than the window 520. The destination rectangle contains data shown as the cross-hatched portion of 530, which lies outside of the Windowrect 520 boundaries. This data is clipped and not displayed in the window.

In the preferred embodiment, UpdateImage next decides if the data image can be copied 340. If the off-screen memory or DRAM that contains the source image data and the on-screen memory VRAM that corresponds to the display that contains the destination window, are not on the same video display card, the data is not copied and an error message is generated. In an alternative embodiment, the data can be moved from the DRAM on the first display to the VRAM on the second display or to the DRAM on the second display. If there is no room on the second DRAM to load the image, the present invention can make room by removing lower priority images from the second DRAM. The gray map is then read and a temporary bit map defined 360. The original source rectangle is modified and passed in a call to the DoProcessMath routine 370. After DoProcessMath, the Zoom point, the top left corner of the source image, is modified to reset the image and if expansion was accomplished by bilinear interpolation of pixels, adjustments are made for an apparent right shifting of the image caused by the bilinear expansion.

The zoom point is set up and converted to monitor coordinates. (There are three coordinates systems: Window coordinates, where the top left corner is always 0,0; global coordinates, where the top left coordinates of the main monitor are 0,0; and monitor coordinates where the top left corner of each monitor is 0,0. Unmappt performs transformations between these coordinate systems).

Finally UpdateImage checks to see if the bit map mask is needed 390. If the window region is equal to the window's visible region, then none of the window is covered by another image and the mask bit map is not required. If part of the window is covered, a flag is set to indicate the mask bit map is needed. When the bit map is needed, the visible region for the window is converted from global coordinates to monitor coordinates, the current monitor is set up and the mask bit map painted. The visible region is painted black on a white background. The Macintosh PaintRegion function converts the visible region to a bit map. The visible region is converted to a monitor coordinates 400. The cursor is hidden and the ProcessRect copy routine called 410. In ProcessRect, the graphics processor copies the image data to on-screen memory VRAM in a preferred embodiment, of the display where the window is located.

PsuedoCopyBits

PsuedoCopyBits operates essentially in the same manner as UpDateImage. PsuedoCopyBits is use to annotate images. A complete listing with comments appears in the Appendix.

DoProcessMath

This function sets up a source rectangle 200 that is the same size as the image. It computes the destination rectangle 210 and figures out the origin depending on where the image is in reference to the window. It clips the destination rectangle 220 when the image is larger than the window by making the destination rectangle smaller so that the copy routine will not put data outside the window. It then computes the top left destination point in window coordinates and converts them to global coordinates. It then converts it to monitor coordinates, and offsets the top left cover of the destination rectangle if it is less than minimum so it will not extend past the top left corner of the display window. It also sets up a new destination rectangle 230 in monitor coordinates (where the image will actually come up on the monitor) and figures out a zoom factor 240, which is the ratio of height of where going to where it is coming from, and the procedure ends 250.

Handling an Update Image Request

The Macintosh operating system generates an Update Image Event to request copying of image to a window. In a preferred embodiment the software used by the present invention runs as an application within the Host computer using a Macintosh operating system. Since the Macintosh is not designed to handle large images, such as those used in the preferred embodiment, which are on the order of 10 megabytes of data, the present invention makes direct calls to an external graphics computer, such as a Dome card, to quickly copy these large images to a display memory.

Referring to FIG. 5, a procedure for event handling in a preferred embodiment of the present invention is shown. An event is a request for action. Many types of events can occur, each requiring a different action. Depressing the mouse button or inserting a disk generates an event. The Macintosh OS generates these events. The Mac OS generates an Update Image Event when image data needs to be written to a display window, typically in response to a user's input via mouse or track ball that creates or moves an image window on the screen. For example, the Macintosh OS generates an Update Image Event when a portion of a previously covered window is uncovered, as shown in FIG. 2, as region 2a. The Macintosh also generates an Update Image Event in response to a request for image data in a window when the window is first created.

As shown in FIG. 5, DoEvent 66 receives the events as they are generated. Handle Event 68 determines if the event is an update Image Event. When Handle Event 68 receives an Update Image Event, the preferred embodiment calls DrawWindow 70, otherwise the preferred embodiment ignores the event. DrawWindow 70 calls iim_update_image 72 to annotate the image window with overlays such as the patient's name. DrawWindow 70 then calls UpdateImage 74 to set up a command to copy image data to the display window and send the command to the graphics controller.

Commanding Display of an Image

To put image on the display screen, the preferred embodiment method calls either UpdateImage 74 or PsuedoCopyBits. UpdateImage 74 copies the image from DRAM to VRAM. VRAM displays the image on the screen. PsuedoCopyBits operates in essentially the same way as UpdateImage 74. A generic depiction of UpdateImage 74 and PsuedoCopyBits is shown in FIG. 3 as copy routine 40.

Copy routine 40, a generic representation of PsuedoCopyBits and Update Image, determines in step 44 whether the image data which needs to be updated can be copied and displayed. In one preferred embodiment, image data can be copied only if the image is loaded on the Dome card of the display where the window to be updated is located. A request to copy from DRAM on one card to VRAM on another card will generate an error message as shown in step 42. Although the Macintosh toolbox function, Copybits, could be called to execute this UpdateImage request, it is so slow that the preferred embodiment simply issues an error message, as it may be faster to reboot the system and start over than to wait on the Macintosh CopyBits routine to transfer several large images to the window.

In another embodiment, the present invention is able to copy from the DRAM of any display in the system to VRAM of any display in the system and would not issue an error message. The present invention may copy image data from a DRAM on a fist display to DRAM on a second display. This enables a user to move an image from the first display to the second display. If the DRAM on the second display is full, and cannot accept an image from the first display, the present invention may remove image data from the DRAM on the second display to allow images from the first DRAM to be copied onto the DRAM for the second display, thus allowing a higher priority image to be displayed on the second display. The present invention may prioritize images based on age, on whether the image is now displayed or any other user defined criteria. After it has been determined that the image can be copied 44, the preferred embodiment of the present method proceeds to call DoProcessMath 46, which performs most of the math required to display an image. DoProcessMath 46 is conceptually a "coordinate transformation program." Once the math is performed, the preferred method calls CopyImage 48, which in the preferred embodiment is a Dome Board procedure. CopyImage 48 copies the data from DRAM to VRAM on the video display card and then returns. In a preferred embodiment of the present invention, step 48 is DoProcessRect, a Dome Board procedure, which performs the copy function.

In the preferred embodiment the present invention, the procedure comprises three steps, as shown in FIG. 3: CopyRoutine 40, CanImageBeCopied 44, and DoProcessMath 46. Alternatively, in a transparent procedure typical in other systems, as shown in FIG. 5, more steps are executed and thus requires more time to execute. In a typical transparent system a call to a graphics function, such as a Macintosh toolbox graphics functions like Copybits, causes entry into copy routine 52 which in turn calls copybits 54. The transparent program then intercepts 56 this call to Copybits and redirects the function call to a transparent program monitor. The monitor decides whether to call a hardware or software version of Copybits. Additional overhead is incurred in these extra steps. The transparent procedure then, typically, tests to see if the image can be copied by hardware 60. If it cannot, it calls a software graphics function, such as the Macintosh toolbox function. If it can be copied, typically a math process 62 prepares the image data and passes the data to the hardware which copies the data into display memory 64.

In describing the invention, reference has been made to a preferred embodiment. However, those skilled in the art and familiar with the disclosure of the invention may recognize additions, deletions, substitutions or other modification which would fall within the scope of the invention as defined in the claims.

APPENDIX

OPTIMIZED IMAGE DISPLAY METHOD SOFTWARE LISTINGS

PDS OID Code

```
 3   typedef long  HistVal[256], *HistValPtr;
 4
 5   typedef WStateData *WStatePtr ;
 6   typedef    WStatePtr  *WStateHandle;
 7
 8
 9
10   /**** PCW frame information ****/
11   #define PCW_MAXFRAMES        25
12
13
14   typedef struct FrameRecord
15   {
16      WindowPtr     parent;       /* Used for Print composition       */
17      MyGWorldPtr      theWorld;  /* the main world                   */
18      Rect          dRect;    /* destination rectangle for image */
19      Rect          padRect;  /* Rectangle for template padding */
20      Rect          bounds;   /* Rectangle coordinates in a PCW's local coordinates. */
21      int              templateID;   /* Format id for frame construction. */
22      Boolean          selected;
23      IIM_IMG_INFO  *image_info; /* Pointer to image record */
24      long          invert;
25      short         page_pos; /* Location in window. Same as array index + 1. */
26   } FrameRecord;
27
28
```

```
29    typedef struct FrameInfo
30    {
31        int             frameCount;
32        short           rows;
33        short           columns;
34        FrameRecord     frames[PCW_MAXFRAMES];
35        long            borderColor;    /* Black or white; default: black */
36        long            def_fr_invert;  /* Default frame inversion */
37        Boolean         dirty;          /* if dirty then it needs to be saved */
38        Rect            WorkBounds;     /* Rectangle containing all frames */
39        Boolean         Auto;           /* Is this an Auto Print window */
40        Boolean         Overlays_on;    /* Display overlays flag */
41    } FrameInfo;
42
43
44    typedef struct     /* a Macintosh window */
45    {
46        QBF             qbf;
47        short           id;         /* Id of the screen */
48        short           running;    /* status flag */
49        WindowPtr       window;     /* Macintosh window handle */
50        QHD             windows;
51    } SCREEN_QUE;
52
53
54    typedef struct
55    {
56        ListHandle      list;
57    } CR_REC, *CR_PTR, **CR_HDL;
58
59
60    typedef struct WindowData
61    {
62        WinInfo         info;
63        CR_HDL          cr;
64        TEHandle        text;       /* A handle to the windows text */
65        ControlHandle   VScrollBar;
66        ControlHandle   HScrollBar;
67        MyGWorldPtr     theWorld;   /* the main world */
68        Boolean         dirty;      /* if dirty then it needs to be saved */
69        Rect            dRect;      /* destination rectangle for zooming */
70        IIM_IMG_INFO    *image_info;
71        SCREEN_QUE      *comUIscreen; /* for the comm window stuff */
72        FrameInfo       *frameInfo;   /* for print composition window */
73        Rect            origLoc;
74        Rect            measLine;   /* the current measure line */
75    } WindowData, *WindowDataPtr, **WDHandle;
76
77
78    #ifdef __IIMGLOBAL__
79    #define     IIM_DEF_EXTERN
80    #define     IIM_DEF_INIT(x)    = x
81    #else
82    #define     IIM_DEF_EXTERN     extern
83    #define     IIM_DEF_INIT(x)
84    #endif
85
86    /* Declare and initialize the various queues used by IIM */
87
88    IIM_DEF_EXTERN    QHD       gPatQue IIM_DEF_INIT(QUE_INIT(gPatQue, NULL, NULL, NULL, NULL));
89
90    IIM_DEF_EXTERN    QHD       gDispQue IIM_DEF_INIT(QUE_INIT(gDispQue, NULL, NULL, NULL, NULL));
91    IIM_DEF_EXTERN    QHD       gPrevQue IIM_DEF_INIT(QUE_INIT(gPrevQue, NULL, NULL, NULL, NULL));
92    IIM_DEF_EXTERN    QHD       gNextQue IIM_DEF_INIT(QUE_INIT(gNextQue, NULL, NULL, NULL, NULL));
93    IIM_DEF_EXTERN    QHD       gPDHeads IIM_DEF_INIT(QUE_INIT(gPDHeads, NULL, NULL, NULL, NULL));    /
94    particular patient */
95
96
97    IIM_DEF_EXTERN    QHD       gPatFreeQue    IIM_DEF_INIT(QUE_INIT(gPatFreeQue, NULL, NULL, NULL, NULL))
98    IIM_DEF_EXTERN    QHD       gStudyFreeQue  IIM_DEF_INIT(QUE_INIT(gStudyFreeQue, NULL, NULL, NULL, )
99    IIM_DEF_EXTERN    QHD       gSeriesFreeQue IIM_DEF_INIT(QUE_INIT(gSeriesFreeQue, NULL, NULL, NULL,
100   IIM_DEF_EXTERN    QHD       gAcqFreeQue    IIM_DEF_INIT(QUE_INIT(gAcqFreeQue, NULL, NULL, NULL, NULL))
101   IIM_DEF_EXTERN    QHD       gImgFreeQue    IIM_DEF_INIT(QUE_INIT(gImgFreeQue, NULL, NULL, NULL, NULL))
102   // IIM_DEF_EXTERN QHD       gAnnFreeQue    IIM_DEF_INIT(QUE_INIT(gAnnFreeQue, NULL, NULL, NULL, NULL))
103
104
105   IIM_DEF_EXTERN    Boolean gFirstImage;
106
107   #undef IIM_DEF_EXTERN
108   #undef IIM_DEF_INIT
109
110
111   /* This is the definitions for the cr_flags field */
112
113   #define CR_IMAGE_ENHANCED        0x0001
114
115   #define cr_mark_pat_enhanced(p) ((p)->cr_flags |= CR_IMAGE_ENHANCED)
```

```
116    #define cr_pat_enhanced(p)       ((p)->cr_flags & CR_IMAGE_ENHANCED)
117    #define cr_mark_pat_not_enhanced(p) ((p)->cr_flags &= -CR_IMAGE_ENHANCED)
118
119    /*
120        Image Information Manager data queue structures.
121            The QHD of the next level down deed to be the first
122            item in each struct to allow trevrsing up the struct queues.
123    */
124
125    typedef   struct buffer  /* for looking at level in an iim buffer */
126    {
127        QHD           dummy;
128        ushort        level;
129    } HDR_BUF, *HDR_BUF_PTR;
130
131    typedef   struct iim_pat_info
132    {
133        QHD                    study_q;
134        QHD                    patDisp_q;    /* local q/patient for handling image movement */
135        QBF                    qbf;
136        DB_ADDR                dba;
137        struct patient         patient;
138        Boolean                answeredSaveAnn;  // user has answered about saving annotations.
139        Boolean                annResponse;      // response to save (SAVE = 1, DISCARD = 0)
140        Boolean                answeredSaveWL;   // user has answered about saving windowLevel.
141        Boolean                wlResponse;       // response to save (SAVE = 1, DISCARD = 0)
142        Boolean                answeredSaveImage; // user has answered about saving Image data
143        Boolean                idResponse;       // response to save (SAVE = 1, DISCARD = 0)
144        ulong                  flags;
145        ulong                  cr_flags;
146    } IIM_PAT_INFO, *IIM_PAT_INFO_PTR;
147
148    typedef   struct iim_study_info
149    {
150        QHD                    series_q;
151        QHD                    report_q;
152        QBF                    qbf;
153        DB_ADDR                dba;
154        struct study           study;
155        ulong                  flags;
156    } IIM_STUDY_INFO, *IIM_STUDY_INFO_PTR;
157
158
159
160    /****************************************/
161    /* Flag definitions for IIM_SERIES_INFO   */
162    /****************************************/
163    #define   SCOUT_INTERSECT   0x0001
164
165
166    typedef   struct iim_series_info
167    {
168        QHD                    acq_q;
169        QBF                    qbf;
170        DB_ADDR                dba;
171        struct series          series;
172        ulong                  flags;
173    } IIM_SERIES_INFO, *IIM_SERIES_INFO_PTR;
174
175
176    typedef   struct iim_acq_info
177    {
178        QHD                    image_q;
179        QBF                    qbf;
180        DB_ADDR                dba;
181        struct acq             acq;
182        ulong                  flags;
183    } IIM_ACQ_INFO, *IIM_ACQ_INFO_PTR;
184
185    typedef short LUT[4096];
186    typedef LUT   *LUT_PTR;
187
188    typedef   struct iim_img_info
189    {
190        QHD                    *ann_q;
191        QBF                    qbf;
192        QBF                    dispQbf;       /* link to display/prev/next queues    */
193        QBF                    patDispQbf;    /* link to local patient display buffer */
194        QBF                    patHeadQbf;    /* link to backward movement que         */
195        DB_ADDR                dba;
196        WindowPtr              window;
197        struct image           image;         /* db structure                        */
198        IMM_IMAGE_INFO         immImageInfo;  /* pointer to memory manager structure */
199        short                  slot;          /* nuBus slot image is residing on     */
200        short                  prevSlot;      /* previous slot for the image         */
201        ulong                  flags;
```

```
202        QHD              *scouts;      /* que of scout lines for an image    */
203        ushort           annFlags;     // flags used to keep track of annotation dirtyness
204        LUT_PTR          d_LUT;        /* The Display LUT                    */
205        LUT_PTR          t_LUT;        /* The Transform LUT                  */
206        LUT_PTR          s_LUT;        /* The Standardization LUT            */
207        void             *demo_data;   /* The Patients parsed demographic data */
208    } IIM_IMG_INFO, *IIM_IMG_INFO_PTR;
209
210    /* structure for annotation layer support */
211    typedef  struct iim_ann_info
212    {
213        QBF                      qbf;
214        struct image_ann         ann;
215        DB_ADDR                  dba;
216        MyGWorldPtr              world;
217        short                    slot;
218        MEM_STRUCT_PTR           memBlock;
219        ulong                    flags;
220    } IIM_ANN_INFO, *IIM_ANN_INFO_PTR;
221
222    /*
223     * This structure is used for doing comparisons of data stored in the
224     * database with the info that is stored in the iim structures of an
225     * image on one of the display queues. Load this structure with global
226     * db info and pass as the last arg to a mapping function.
227     */
228    typedef  struct IMAGE_OBJ
229        {
230            struct patient *patient; /* these are fields from idb.h */
231            struct study   *study;
232            struct series  *series;
233            struct acq     *acq;
234            struct image   *image;
235        } IMAGE_OBJ, *IMAGE_OBJ_PTR;
236
237
238
239
240    /*/\/\/\/\/\/\/\/\/\/\/\/\/\/\/\/\/\/\/\/\/\/\/\/\/\/\/\/\*/
241    /* flags                                                        */
242    /*/\/\/\/\/\/\/\/\/\/\/\/\/\/\/\/\/\/\/\/\/\/\/\/\/\/\/\/\*/
243
244
245    #define   IMM_NO_ANN_DIRTY          0x0000
246
247    #define   IMM_FLAG_DIRTY            0x00008000
248
249    #define   IMM_IMG_FLAG_NEED_LOADED  0x00000001
250    #define   IMM_IMG_FLAG_LOADED       0x00000002
251    #define   IMM_IMG_PURGEABLE         0x00000004
252    #define   IMM_IMG_FLAG_PRELOADING   0x00000008
253    #define   IMM_IMG_DISPLAYED         0x00000010
254    #define   IMM_IMG_NODIST_FLAG       0x00000020
255    #define   IMM_IMG_VIRTUAL_LOAD      0x00000040
256    #define   IMM_IMG_DATA_DIRTY        0x00000100
257    #define   IMM_FLAG_RECEIVED         0x00000200
258    #define   IMM_FLAG_PRELOAD_ERR      0x00000400
259    #define   IMM_IMG_LOCKED_FLAG       0x00001000
260    #define   IMM_ANN_FLAG_LOADED       0x00010000
261    #define   IMM_ANN_FLAG_NEED_LOADED  0x00020000
262    #define   IMM_FLAG_POSTABLE         0x00100000
263    #define   IMM_FLAG_CACHEABLE        0x01000000
264    #define   IMM_FLAG_CACHED           0x02000000
265
266    /*/\/\/\/\/\/\/\/\/\/\/\/\/\/\/\/\/\/\/\/\/\/\/\/\/\/\/\/\*/
267    /* macros                                                       */
268    /*/\/\/\/\/\/\/\/\/\/\/\/\/\/\/\/\/\/\/\/\/\/\/\/\/\/\/\/\*/
269
270
271
272    // This macro is used to navigate up the image heirarchy
273    #define   iim_owner(b)     ((void *)(((char *)que_buf_que(&b->qbf))))
274
275    // An iim db structure is marked dirty when any of the database
276    // information has been changed and needs to be saved to disk
277    #define   iim_mark_dirty(s) ((s)->flags |= IMM_FLAG_DIRTY)
278    #define   iim_mark_not_dirty(s)    ((s)->flags &= ~IMM_FLAG_DIRTY)
279    #define   iim_dirty(s)     ((s)->flags & IMM_FLAG_DIRTY)
280
281
282    // Mark an image as having a preload err
283    #define ImmMarkPreloadErr(s) ((s)->flags |= IMM_FLAG_PRELOAD_ERR)
284    #define ImmPreloadErr(s) ((s)->flags & IMM_FLAG_PRELOAD_ERR)
285
286
287
```

```
288    // Handle marking of flags for reciept of an image via comm
289    #define ImmReceived(s) ((s)->flags & IMM_FLAG_RECEIVED)
290    #define ImmMarkReceived(s) ((s)->flags |= IMM_FLAG_RECEIVED)
291    #define ImmUnmarkReceived(s) ((s)->flags &= -IMM_FLAG_RECEIVED)
292
293    // Handle marking of images for cacheing.
294    #define ImmCacheable(s) ((s)->flags & IMM_FLAG_CACHEABLE)
295    #define ImmMarkCacheable(s) ((s)->flags |= IMM_FLAG_CACHEABLE)
296    #define ImmUnMarkCacheable(s) ((s)->flags &= -IMM_FLAG_CACHEABLE)
297    #define ImmCached(s) ((s)->flags & IMM_FLAG_CACHED)
298    #define ImmMarkCached(s) ((s)->flags = ((s)->flags &= -IMM_FLAG_CACHEABLE) | IMM_FLAG_CACHED )
299    #define ImmUnMarkCached(s) ((s)->flags &= -(IMM_FLAG_CACHED | IMM_FLAG_CACHEABLE))
300
301    // Mark a hierarchy level as being postable or non-postable
302    #define    ImmPostable(s)    ((s)->flags & IMM_FLAG_POSTABLE)
303    #define ImmMarkPostable(s) ((s)->flags |= IMM_FLAG_POSTABLE)
304    #define ImmUnmarkPostable(s) ((s)->flags &= -IMM_FLAG_POSTABLE)
305
306    // An image is purgeable after it has been closed from the display or has
307    // been moved from the next to the previous queues
308    #define ImmPurgeable(s)      ((s)->flags & IMM_IMG_PURGEABLE)
309    #define    ImmMarkPurgeable(s) ((s)->flags |= IMM_IMG_PURGEABLE)
310    #define ImmMarkUnPurgeable(s) ((s)->flags &= -IMM_IMG_PURGEABLE)
311
312    // An image needs to be loaded into RAM
313    #define ImmNeedLoaded(s) ((s)->flags & IMM_IMG_FLAG_NEED_LOADED)
314    #define ImmMarkNeedLoaded(s) ((s)->flags = ((s)->flags & -IMM_IMG_FLAG_LOADED) | IMM_IMG_FLAG_NEED_LOA
315
316    // An image is currently loaded in RAM
317    #define ImmLoaded(s)     ((s)->flags & IMM_IMG_FLAG_LOADED)
318    #define ImmMarkLoaded(s) ((s)->flags = ((s)->flags & -(IMM_IMG_FLAG_NEED_LOADED | IMM_IMG_FLAG_PRELOAD
319    IMM_FLAG_PRELOAD_ERR)) | IMM_IMG_FLAG_LOADED)
320    #define ImmMarkUnloaded(s)   ((s)->flags = ((s)->flags & -(IMM_IMG_FLAG_LOADED | IMM_IMG_PURGEABLE | IM
321
322    // If an image (or any level in the heirarchy has been seen
323    #define ImmMarkDisplayed(s) ((s)->flags |= IMM_IMG_DISPLAYED)
324    #define ImmDisplayed(s)     ((s)->flags & IMM_IMG_DISPLAYED)
325    #define ImmMarkNotDisplayed(s) ((s)->flags &= -IMM_IMG_DISPLAYED)
326
327    // Data dirty used when an image is flipped or rotated
328    #define ImmMarkDataDirty(s) ((s)->flags |= IMM_IMG_DATA_DIRTY)
329    #define ImmDataDirty(s)     ((s)->flags & IMM_IMG_DATA_DIRTY)
330    #define ImmMarkDataClean(s) ((s)->flags = ((s)->flags & -IMM_IMG_DATA_DIRTY))
331
332    // Preloading flags indicate an image is current in gImageLI
333    #define    ImmMarkPreloading(s) ((s)->flags |= IMM_IMG_FLAG_PRELOADING)
334    #define ImmUnMarkPreloading(s) ((s)->flags &= -IMM_IMG_FLAG_PRELOADING)
335    #define    ImmPreloading(s)     ((s)->flags & IMM_IMG_FLAG_PRELOADING)
336
337    // Lock an image in memory so it cannot be unloaded.
338    #define ImmLocked(s)      ((s)->flags & IMM_IMG_LOCKED_FLAG)
339    #define ImmLockImage(s)   ((s)->flags |= IMM_IMG_LOCKED_FLAG)
340    #define ImmUnlockImage(s) ((s)->flags &= -IMM_IMG_LOCKED_FLAG)
341
342    // Virtual memory loading macros
343    #define ImmLoadVirtual(s)       ((s)->flags & IMM_IMG_VIRTUAL_LOAD)
344    #define ImmMarkLoadVirtual(s)   ((s)->flags |= IMM_IMG_VIRTUAL_LOAD)
345    #define ImmUnMarkLoadVirtual(s) ((s)->flags &= -(IMM_IMG_VIRTUAL_LOAD))
346
347    // The distribution flags indicate that an image must be completely
348    // allocated on the slot requested in image->slot for the allocation
349    // to be valid
350    #define ImmMarkNoDist(s) ((s)->flags |= IMM_IMG_NODIST_FLAG)
351    #define ImmUnMarkNoDist(s)  ((s)->flags &= -IMM_IMG_NODIST_FLAG)
352    #define ImmImageNoDist(s)   ((s)->flags & IMM_IMG_NODIST_FLAG)
353
354    // Annotation flag macros
355    #define iim_ann_dirty(s) ((s)->annFlags & 0xFFFF)
356    #define iim_mark_ann_dirty(s, x) ((s)->annFlags = ((s)->annFlags | (x)))
357    #define iim_mark_ann_not_dirty(s, x) ((s)->annFlags = ((s)->annFlags & (-x)))
358    #define ImmAnnLoaded(s)   ((s)->flags & IMM_ANN_FLAG_LOADED)
359    #define ImmMarkAnnLoaded(s) ((s)->flags |= IMM_ANN_FLAG_LOADED)
360    #define ImmMarkAnnNotLoaded(s) ((s)->flags &= -IMM_ANN_FLAG_LOADED)
361
362    /*/\/\/\/\/\/\/\/\/\/\/\/\/\/\/\/\/\/\/\/\/\/\/\/\/\/\/\/\/\*/
363    /*      function prototypes                                 */
364    /*/\/\/\/\/\/\/\/\/\/\/\/\/\/\/\/\/\/\/\/\/\/\/\/\/\/\/\/\/\*/
365
366
367    long   iim_init(void);
368    long   iim_disp(void);
369    long   iim_set_dbi_globals(IIM_IMG_INFO *image);
370    long   iim_close_img(IIM_IMG_INFO *image);
371    long   iim_image_disp(IIM_IMG_INFO *image);
372    long   iim_image_prev(IIM_IMG_INFO *image);
373.   long   iim_image_next(IIM_IMG_INFO *image);
```

```
374    long    iim_update_image(IIM_IMG_INFO *image);
375    long    iim_shutdown();
376    char    *iim_map_name_to_value(char *name, IIM_IMG_INFO *image);
377    long    iim_order_pat_disp(QHD *q, IIM_IMG_INFO_PTR   theImage);
378    long    iim_is_loaded(struct patient *patient,
379                    struct study *study,
380                    struct series *series,
381                    struct acq *acq,
382                    struct image *image,
383                    IIM_IMG_INFO_PTR *anImage);
384    IIM_IMG_INFO_PTR iim_pack_on_que(QHD *q, IIM_IMG_INFO_PTR theImage, IMAGE_OBJ_PTR imagePack);
385    long    iim_del_image(struct patient    *thePatient,
386                       struct study   *theStudy,
387                       struct series    *theSeries,
388                       struct acq      *theAcq,
389                       struct image  *theImage);
390    long    iim_del_ann(struct patient *patient, char *ann_fn);
391    long    iim_del_patient_folder(struct patient *thePatient);
392    long    iim_save_ann(IIM_IMG_INFO_PTR theImage);
393    long    iim_del_func(int level, DBI_QUERY *query);
394    long    iim_add_ann(IIM_IMG_INFO_PTR theImage, struct image_ann *ann, DB_ADDR dba);
395    long    iim_write_mem_ann(struct image_ann *, IIM_IMG_INFO_PTR image, IIM_ANN_INFO_PTR );
396    long    iim_push_dbi_globals(void);
397    long    iim_pop_dbi_globals(void);
398    /*IIM_PAT_INFO_PTR iim_find_patient_to_close(void *bufPtr); */
399    /*long iim_close_patient(void *bufPtr); */
400    IIM_PAT_INFO_PTR iim_find_patient_to_close(void *bufPtr, ushort level);
401    long    iim_close_patient(void *bufPtr, ushort level);
402    long iim_image_received(struct patient *patient,
403                    struct study *study,
404                    struct series *series,
405                    struct acq *acq,
406                    struct image *image);
407
408    long iim_mapped_close_img(IIM_IMG_INFO *image);
409    long iim_remove_ann(IIM_IMG_INFO_PTR image);
410    IIM_PAT_INFO_PTR iim_get_pat_from_image(IIM_IMG_INFO_PTR image);
411    long iim_image_received_failed(struct patient *patient,
412                    struct study *study,
413                    struct series *series,
414                    struct acq *acq,
415                    struct image *image);
416    long    iim_do_update_ACRNema(IIM_IMG_INFO_PTR image, char *operation);
417    long    iim_check_save_image_data(IIM_IMG_INFO_PTR image, Boolean writeTrue);
418
419
420                  .
421
422
423    /*.************************************************************
424
425        Determines wether a mask bitmap is needed or not.
426
427    ************************************************************/
428    Boolean NeedMask(WindowPtr window)
429    {
430        RgnHandle  r = NewRgn();
431
432        if (r == NULL)
433            DoCatastrophic();
434
435        RectRgn(r, &window->portRect);
436
437        if (EqualRgn(r, window->visRgn))
438        {
439            DisposeRgn(r);
440            return(false);
441        }
442        else
443        {
444            DisposeRgn(r);
445            return(true);
446        }
447    }
448
449    /*.************************************************************
450
451    NAME:
452        DoProcessMath
453    SYNOPSIS:
454
455    DESCRIPTION:
456        This function does the math to figure out all the parameters
457        for the D_ProcessRect function. This is used in a couple of
458        places, so for consistency, this function exists.
459    PARAMETERS:
460        Rect       *rect  : the source rectangle that the image is
```

```
461                     to be blitted from. This rectangle
462                     is changed to the destination rectangle
463                     by this function.
464     Point    *origin  : the image source origin.
465     UDWORD   *zoom   : the zoom factor.
466  OUTPUT:
467
468  RETURN:
469
470  WARNINGS:
471
472  /*****************************************************************/
473  void DoProcessMath(IIM_IMG_INFO *image, Rect *rect, Point *origin, UDWORD *zoom)
474  {
475      Rect        sRect;
476      Rect        source = *rect;
477      Rect        map;
478      Rect        dRect = GetWindowdRect(image->window);
479      GDHandle    device = Window2Device(image->window);
480      Point       tl;
481      short       height, width;
482      short       min;
483
484      /* Setup the source rectangle based on the image size */
485      SetRect(&sRect, 0, 0, image->image.cols, image->image.rows);
486      min = 0;
487
488      /* compute the destination rectangle */
489      MapRect(rect, &sRect, &dRect);
490
491      /* compute the origin */
492      origin->h = rect->left < min ? -(long)(rect->left) * (long)sRect.right/(long)RECT_WIDTH(dRect) : s(
493      origin->v = rect->top < min ? -(long)(rect->top) * (long)sRect.bottom/(long)RECT_HEIGHT(dRect) : s(
494
495      /* Clip the destination rectangle for portions not visible  */
496      if (rect->left < min) rect->left = min;
497      if (rect->top < min) rect->top = min;
498      if (rect->right > image->window->portRect.right) rect->right = image->window->portRect.right;
499      if (rect->bottom > image->window->portRect.bottom) rect->bottom = image->window->portRect.bottom;
500
501      /* compute the topleft destination point  */
502      tl.h = rect->left;
503      tl.v = rect->top;
504
505      /* Convert it to global coordinates */
506      LocalToGlobal(&tl);
507
508      /* Convert it to Monitor coordinates.
509      tl.h -= (*device)->gdRect.left;
510      tl.v -= (*device)->gdRect.top;
511
512      /* Offset the topleft point for destination < min */
513      if (rect->left < min) tl.h -= rect->left;
514      if (rect->top < min) tl.v -= rect->top;
515
516      /* figure out the width and height */
517      width = MIN(rect->right, image->window->portRect.right) - MAX(rect->left, image->window->portRect.:
518      height = MIN(rect->bottom, image->window->portRect.bottom) - MAX(rect->top, image->window->portRect
519
520      /* Setup the new destination rectangle in monitor coordinates   */
521      SetRect(rect, tl.h, tl.v, tl.h + width, tl.v + height);
522
523      /* figure out the zoom factor */
524      map = source;
525      MapRect(&map, &sRect, &dRect);
526      *zoom = (RECT_WIDTH(dRect) << 16) / RECT_WIDTH(sRect);
527  }
528
529
530  /*******************************************************************************
531
532      Copies an image chunk to the image window. If the chunk is not on the
533      same card as the window a CopyBits is performed instead.
534
535  *******************************************************************************/
536  short UpdateImage(Rect *chunkRect, IIM_IMG_INFO *image, IMAGE_CHUNK_PTR theChunk)
537  {
538      char            *fn="UpdateImage";
539      Rect            windowRect;
540      Rect            chunk = *chunkRect;
541      Rect            sRect, dRect;
542      MyGWorldPtr     windowWorld = GetWindowWorld(image->window);
543      Point           origin;
544      short           domeID, slot;
545      GDHandle        device;
546      WDHandle        data;
547      Rect            rect;
```

```
548        UDWORD      zoom, flags = PROC_COPYLUT | PROC_ZOOM | PROC_ZOOMINIT;
549        UDWORD      maskMap = 0;
550        short       x, y;
551        PixMapPtr   pPM;
552        SDWORD      factor;
553        Point       zoom_pt;
554        Rect        cRect;
555        Point       pt = {0, 0};
556
557
558        /* If doing a synchronous image copy, vice an asynchronous copy */
559        if (gCopySync)
560            flags |= PROC_SYNC;
561
562        /* Test that we were not told to copy a NULL image     */
563        if (image == NULL) {
564            log_abnormal0("UpdateImage: passed a NULL image info pointer.");
565            return(-1);
566        }
567
568        /* Make sure we have a valid window to copy the image into   */
569        if (image->window == NULL) {
570            log_abnormal0("UpdateImage: the image info pointer a NULL window pointer.");
571            return(-1);
572        }
573
574        /* Get a handle to the image's GWorld which describes the bounds of the image */
575        windowWorld = GetWindowWorld(image->window);
576        if (windowWorld == NULL) {
577            log_abnormal0("UpdateImage: the image info pointer has no world.");
578            return(-1);
579        }
580
581        /* If we're operating with virtual memory, make sure the image is loaded   */
582        /* into RAM first                                                          */
583        if (gVirtualOn)
584        {
585            log_debug1("%s: Virtual memory enabled, testing for loaded image.",fn);
586            if (!ImmLoaded(image))
587            {
588                log_debug1("%s: Need to load image.", fn);
589                ImmMarkLoadVirtual(image);
590                if (ImmLoadImage(image))
591                {
592                    log_abnormal1("%s: Failed to load image.", fn);
593                    return(-1);
594                }
595
596            }
597
598        }
599
600        /* Get the windows data handle */
601        data = (WDHandle)GetWRefCon(image->window);
602
603        /* Set the current graphics port   */
604        SetPort(image->window);
605
606        /* Get the windows destination rectangle, This is the rectangle that   */
607        /* we want the image to be copied into. This rectangle may be larger   */
608        /* than the window, if so the image will be clipped to fit inside      */
609        /* the window.                                                         */
610        dRect = (**data).dRect;
611        SetRect(&sRect, 0, 0, image->image.cols, image->image.rows);
612        windowRect = image->window->portRect;
613
614        /* Setup the graphic world's variables for later use */
615        (**windowWorld->portPixMap).baseAddr = (Ptr)theChunk->memLink->address;
616        (**windowWorld->portPixMap).bounds = *chunkRect;
617
618        /* Figure out what graphics device this window is on */
619        device = Window2Device(image->window);
620
621        /* figure out what slot this graphics device is in   */
622        slot = Device2Slot(device);
623        if ( (IsDomeDevice(device)) && (slot == MAC_ADDR_2_SLOT(theChunk->memLink->address)))
624        {
625            /* If we want to display an image on a card
626
627            GetDomeFromSlot(slot, &domeID);
628            if (domeID < 0)
629                return(-1);
630
631            D_SetDevice(domeID); /* Set the current dome device */
632
633            /* set the values of the lookup table */
```

```
634         SetGrayMap(image);
635
636         /* define a temporary bitmap for the copy */
637         gDomeInfo[domeID]->current_image = D_DefBitmap(sRect.right+1, sRect.bottom+1, image->image.bits
638              BIT_HOSTADDR, theChunk->memLink->address, PITCH(image->image.rowbytes));
639
640         if ( gDomeInfo[domeID]->current_image == 0)
641         {
642             log_abnormal1("%s: unable to allocate a bitmap to copy the image", fn);
643             return(-1);
644         }
645
646         /* Setup the original source rectangle that will be modified */
647         /* to be the final source rectangle.                         */
648         rect = sRect;
649
650         /* Do the math for the ProcessRect function. */
651         DoProcessMath(image, &rect, &origin, &zoom);
652
653         /* Modify the zoom point of the destination rectangle is negative  */
654         if (dRect.left < 0)
655             zoom_pt.h = -dRect.left;
656         else
657             zoom_pt.h = 0;
658
659         if (dRect.top < 0)
660             zoom_pt.v = -dRect.top;
661         else
662             zoom_pt.v = 0;
663
664         /* If not performing a bilinear interpolated zoom, shift the zoom  */
665         /* point. This is necessary to compensate for the perceived        */
666         /* shifting that is generated by the interpolated zoom.            */
667         if (!gBilinear)
668         {
669             zoom_pt.h += zoom >> 17;
670             zoom_pt.v += zoom >> 17;
671         }
672         else
673             flags |= PROC_BILINEAR;
674
675         /* Setup the origin for the zoom, and convert it to monitor coordinated. */
676         origin = zoom_pt;
677         D_UnmapPt(&origin, zoom);
678
679         /* figure out the factor.  */
680         factor = D_PointToXY(zoom_pt);
681
682         /* figure out if a mask bitmap is needed or not */
683         if (NeedMask(image->window))
684         {
685             flags |= PROC_MASK;
686
687             /* figure out the topleft corner of the device in global */
688             /* coordinates.                                          */
689             pPM = *(((CWindowPtr) (image->window))->portPixMap);
690             x = pPM->bounds.left + (*device)->gdRect.left;      /* Offsets from local coords to DOME */
691             y = pPM->bounds.top + (*device)->gdRect.top;
692             maskMap = gDomeInfo[domeID]->mask_map;
693
694             /* offset the visible region of the window to convert it to */
695             /* monitor coordinates.                                      */
696             OffsetRgn (image->window->visRgn, -x, -y);
697
698             SetPort((GrafPtr)&(mask[domeID]->port));
699             ClipRect(&rect);
700             SetGDevice(GetMainDevice());
701
702             /* Clear the mask bitmap */
703             ForeColor(whiteColor);
704             PaintRect(&rect);
705
706             /* paint the visible region in black, this region will be */
707             /* the one bit deep bitmap that we will be use for the    */
708             /* masked copy.                                            */
709             ForeColor(blackColor);
710             BackColor(whiteColor);
711             PaintRgn (image->window->visRgn);
712
713             /* convert the visible region back into global coordinates. */
714             OffsetRgn (image->window->visRgn, x, y);
715         }
716
717         SetPort(image->window);
718
719         /* obscure the cursor so that it won't punch a hole in the image. */
720         cRect = image->window->portRect;
721         LocalToGlobal(&TopLeft(cRect));
```

```
722         LocalToGlobal(&BotRight(cRect));
723         ShieldCursor(&cRect, pt);
724
725         /* Do the copy. */
726         D_Sync();
727         D_ProcessRect( gDomeInfo[domeID]->current_image, SCREEN_BITMAP, maskMap,
728                        origin.h, origin.v, rect.left, rect.top,
729                        RECT_WIDTH(rect), RECT_HEIGHT(rect), rect.left, rect.top,
730                        factor, flags, zoom, 0);
731
732         ShowCursor();
733
734         /* Free the temporary bitmap. */
735         D_FreeBitmap(gDomeInfo[domeID]->current_image);
736     }
737     else
738     {
739         /* PDS does not yet support copying an image from one card to another. */
740         MoveTo(theChunk->bounds.left + 10, theChunk->bounds.top + 50);
741         SetPort(image->window);
742         ForeColor(whiteColor);
743         TextSize(24);
744         TextFont(times);
745         DrawString("\pInsufficient memory to display image");
746         ForeColor(blackColor);
747     }
748     return(noErr);
749 }
750
751
752
753 /*.*****************************************************************
754
755     The source bitmap must be in DRAM and the destination bitmap must be
756     the windows bitmap.
757
758 *******************************************************************/
759 void PseudoCopyBits(UDWORD srcBits, Rect *destRect, Point destTL, Boolean bilinear)
760 {
761     Rect            dest = *destRect;
762     Rect            windowRect = THEPORT->portRect;
763     IIM_IMG_INFO    *image = get_windows_iim(gWindowPort);
764     UDWORD          zoom, flags = flags = PROC_COPYLUT | PROC_SYNC | PROC_ZOOM | PROC_ZOOMINIT;
765     UDWORD          maskMap = 0;
766     Rect            rect;
767     Rect            dRect = GetWindowdRect(gWindowPort);
768     GDHandle        device = Window2Device(gWindowPort);
769     PixMapPtr       pPM;
770     short           x, y;
771     Point           origin;
772     SDWORD          factor;
773     Point           zoom_pt;
774     Rect            sRect;
775
776
777     if (bilinear)
778         flags |= PROC_BILINEAR;
779
780     /* Setup the original source rectangle. */
781     SetRect(&sRect, 0, 0, GetImageWidth(gWindowPort), GetImageHeight(gWindowPort));
782
783     D_SetDevice(gCurrentDomeID);    /* Set the current dome device */
784
785     /* setup the lookup table */
786     SetGrayMap(image);
787
788     /* Setup the original destination rectangle that will be  */
789     /* modified to be the final destination rectangle.        */
790     rect = *destRect;
791     DoProcessMath(image, &rect, &origin, &zoom);
792
793     /* figure out if a mask bitmap is needed or not */
794     if (NeedMask(gWindowPort))
795     {
796         flags |= PROC_MASK;
797
798         /* figure out the topleft corner of the device in global */
799         /* coordinates.                                          */
800         pPM = *(((CWindowPtr)(image->window))->portPixMap);
801         x = pPM->bounds.left + (*device)->gdRect.left;      /* Offsets from local coords to DOME coor
802         y = pPM->bounds.top + (*device)->gdRect.top;
803
804         maskMap = gDomeInfo[gCurrentDomeID]->mask_map;
805
806         /* offset the visible region of the window to convert it to */
807         /* monitor coordinates.                                     */
808         OffsetRgn(image->window->visRgn, -x, -y);
```

```
809
810            SetPort((GrafPtr)&(mask[gCurrentDomeID]->port));
811            ClipRect(&rect);
812            SetGDevice(GetMainDevice());
813
814            /* Clear the mask bitmap */
815            ForeColor(whiteColor);
816            PaintRect(&rect);
817
818            /* paint the visi e region in black, this region will be    */
819            /* the one bit deep bitmap that we will be use for the      */
820            /* masked copy.                                             */
821            ForeColor(blackColor);
822            BackColor(whiteColor);
823            PaintRgn (image->window->visRgn);
824
825            /* convert the visible region back into global coordinates. */
826            OffsetRgn (image->window->visRgn, x, y);
827        }
828
829        HideCursor();
830
831        /* Adjust the zoom point for fractional pixels    */
832        zoom_pt.h = -dRect.left + destTL.h;
833        zoom_pt.v = -dRect.top + destTL.v;
834        factor = (zoom_pt.v << 16) + zoom_pt.h;
835
836        /* Do the masked copy    */
837        D_ProcessRect(   srcBits, SCREEN_BITMAP, maskMap,
838                         origin.h, origin.v, rect.left, rect.top,
839                         RECT_WIDTH(rect), RECT_HEIGHT(rect), rect.left, rect.top,
840                         factor, flags, zoom, 0);
841
842        ShowCursor();
843        SetPort(gWindowPort);
844    }
```

LoadDeviceConfig

```
long    LoadDeviceConfig(void)
{
    char    *fn = "LoadDeviceConfig";
    short   i, j;
    INFO    domeInfo = { WS(INFO), INFO_ID };
    UDWORD  maskAddr;       /* The address of the mask Bitmap */
    char    errString[256];
    char    mode;

/* determine if this machine can handle a nuBus card with > 1 meg address space */ pragma unused(maskAddr)

if(!CHECKNUBUS())
        return(-1);

/* Map over the video devices and make sure that all Dome cards are Vortech Dome Cards
*/ if (!GetDomeRevInfo())
    {
        log_abnormall("%s: One of the Dome cards is not a Vortech Card.", fn);
        DoGeneric((PSTRTC)C2PSTR(GetErrorString(illegalVideo, &errString)), illegalVideo);
    } gImmConfig.numDome = D_InitDOME();
    log_debug1("%d DOME cards found", gImmConfig.numDome);

if (gImmConfig.numDome > 0)
    {
        log_debug1("%s: Resetting all DOME cards", fn);
        for (i = 0; i < gImmConfig.numDome; i++)
        {
            D_SetDevice(i);

if (!D_CheckDOME(rDomeOS))
            {
                for ( j = 0; !D_CheckDOME(false) && j < 10; j++)
```

```
            if (j == 10)
            {
                log_fatal2("%s: CheckDome failed on card: %d", fn, i);
                return(-1);
            }
        }
        D_ResetDOME(RESET_BOARD);
        gDomeRamPool[i].slot = -1;
    } for (i = 0; i < gImmConfig.numDome; i++)
    {
        D_SetDevice(i);

mask[i] = vcalloc(1, sizeof(MASKGLOBALS));
        if (mask[i] == NULL)
            return(memFullErr);

/***********************************/
        /* calloc the DOME info structure  */
        /***********************************/
        gDomeInfo[i] = (DOME_INFO_PTR)vcalloc(1, sizeof(DOME_INFO));
        if (gDomeInfo[i] == NULL)
            return(memFullErr);

/****************************************************************/
        /* Load the Unsharp Masking package into each dome card */
        /****************************************************************/
        gDomeInfo[i]->usmPackID = D_LoadPackage(rUnsharpPackage, 0);
        if (gDomeInfo[i]->usmPackID == 0)
        {
            log_fatal2("%s: ERROR loading the unsharp masking package id %d",
                fn, rUnsharpPackage);
            return(resNotFound);
        }

D_GetDevInfo(i, &domeInfo);

domeInfo.strucWords = sizeof(INFO);
        gDomeRamPool[i].slot = domeInfo.portAddr;
        log_debug3("%s: Dome card %d found at slot %x", fn, i, gDomeRamPool[i].slot);

/******************************************/
        /* alloc TI memory for the usm structure */
        /******************************************/
        gDomeInfo[i]->gspUsm = (UsmHDRPtr)D_AllocMem(sizeof(UsmHDR));
        if(gDomeInfo[i]->gspUsm == NULL)
        {
            log_abnormal2("%s: ERROR allocating space for the usm struct on Dome card %d",
                fn, i);
            return(memFullErr);
        }

/* convert this TI address to a mac address */
        gDomeInfo[i]->usm = (UsmHDRPtr)TiToMacAddr(gDomeRamPool[i].slot, gDomeInfo[i]->gspUsm);

/*******************************************/
        /* Allocate space for the Boost Table */
        /*******************************************/
        mode = true32b;
        SwapMMUMode(&mode);
        gDomeInfo[i]->usm->BoostTbl = D_AllocMem((1<<12) * sizeof(long));
        if(gDomeInfo[i]->usm->BoostTbl == 0)
        {
            SwapMMUMode(&mode); // Swap back into 24-bit mode.
            log_abnormal2("%s: ERROR allocating space for the boost table on Dome card %d",
                fn, i);
            return(memFullErr);
        }

/****************************************************************/
        /* Allocate space for the Accumulator Array, in TI address coord */
        /****************************************************************/
        gDomeInfo[i]->usm->Acc = D_AllocMem(kMaxCRImageWidth * sizeof(long));
        if(gDomeInfo[i]->usm->Acc == 0)
        {
```

```
            SwapMMUMode(&mode); // Swap back into 24-bit mode.
            log_abnormal2("%s: ERROR allocating space for the Accumulator Array on Dome card %d",
                fn, i);
            return(memFullErr);
        }
        SwapMMUMode(&mode); // Swap back into 24-bit mode.

/***************************/
        /* setup the mask bitmap */
        /***************************/
        gDomeInfo[i]->mask_map = D_AllocBitmap(domeInfo.display.p.x, domeInfo.display.p.y,
                1, BIT_HOSTADDR);
        if (gDomeInfo[i]->mask_map == 0)
        {
            log_fatal2("%s: unable to setup a mask bitmap for DOME card %d", fn, i);
            return(memFullErr);
        } log_debug1("%s: Initializing the mask port.", fn);
        InitMaskPort(&mask[i]->port, (Ptr)D_GetBitmapAddr(gDomeInfo[i]->mask_map), domeInfo);
        mask[i]->rgn = NewRgn();
        if (mask[i]->rgn == NULL)
        {
            log_fatal2("%s: unable to create a region for card %d", fn, i);
            return(memFullErr);
        }

/************************************************/
        /* Initialize the Unsharp masking package. */
        /************************************************/ log_debug1("%s: Initializing the unsharp masking function", fn);
        D_CallAppFunc(gDomeInfo[i]->usmPackID, 2, (LPUWORD)&gDomeInfo[i]->gspUsm, 0, 0);

gDomeRamPool[i].length = D_GetFreeSize(MEM_TOTAL);
        log_debug3("%s: Dome card %d has %8ld total bytes available for allocation", fn, i, gDomeRamPool[i
].length);
        log_debug3("%s: Dome card %d has 0x%81X total offscreen bytes", fn, i, domeInfo.offScrn);
        }
    } for (i = 0; i < gImmConfig.numMem; i++)
        gNuBusRamPool[i].slot = -1;

return(noErr);

}

Function        File                Page    Type

OID Allocation Code     1

InitMaskPort    OID Allocation Code     1   void
LoadDeviceConfig OID Allocation Code    2   long
```

DoProcessMath

```
/*********************************************************
NAME:
    DoProcessMath
SYNOPSIS:

DESCRIPTION:
    This function does the math to figure out all the parameters
    for the D_ProcessRect function. This is used in a couple of
    places, so for consistency, this function exists.
PARAMETERS:
    Rect        *rect   : the source rectangle that the image is
                          to be blitted from. This rectangle
                          is changed to the destination rectangle
                          by this function.
    Point       *origin : the image source origin.
    UDWORD      *zoom   : the zoom factor.
OUTPUT:

RETURN:

WARNINGS:

*********************************************************/
void DoProcessMath(IIM_IMG_INFO *image, Rect *rect, Point *origin, UDWORD *zoom)
```

*srcRect from fig 2 +1*

```
{
    Rect            sRect;
    Rect            source = *rect;
    Rect            map;
    Rect            dRect = GetWindowdRect(image->window);
    GDHandle        device = Window2Device(image->window);
    Point           tl;
    short           height, width;
    short           min;

/* Setup the source rectangle based on the image size   */
    SetRect(&sRect, 0, 0, image->image.cols, image->image.rows);
    min = 0;

/* compute the destination rectangle */
    MapRect(rect, &sRect, &dRect);                         from fig 2

/* compute the origin */
    origin->h = rect->left < min ? -(long)(rect->left) * (long)sRect.right/(long)RECT_WIDTH(dRect) :
source.left;
    origin->v = rect->top < min ? -(long)(rect->top) * (long)sRect.bottom/(long)RECT_HEIGHT(dRect) :
source.top;

/* Clip the destination rectangle for portions not visible */
    if (rect->left < min) rect->left = min;
    if (rect->top < min) rect->top = min;
    if (rect->right > image->window->portRect.right) rect->right = image->window->portRect.right;
    if (rect->bottom > image->window->portRect.bottom) rect->bottom = image->window->portRect.bottom;

/* compute the topleft destination point   */
    tl.h = rect->left;
    tl.v = rect->top;

/* Convert it to global coordinates */
    LocalToGlobal(&tl);

/* Convert it to Monitor coordinates.
    tl.h -= (*device)->gdRect.left;
    tl.v -= (*device)->gdRect.top;

/* Offset the topleft point for destination < min  */
    if (rect->left < min) tl.h -= rect->left;
    if (rect->top < min) tl.v -= rect->top;

/* figure out the width and height */
    width  = MIN(rect->right, image->window->portRect.right) - MAX(rect->left, image->window->portRect.left);
    height = MIN(rect->bottom, image->window->portRect.bottom) - MAX(rect->top, image->window->portRect.top);

/* Setup the new destination rectangle in monitor coordinates   */
    SetRect(rect, tl.h, tl.v, tl.h + width, tl.v + height);

/* figure out the zoom factor */
    map = source;
    MapRect(&map, &sRect, &dRect);
    *zoom = (RECT_WIDTH(dRect) << 16) / RECT_WIDTH(sRect);
}
```

UpdateImage

```
/*******************************************************************************
    Copies an image chunk to the image window.  If the chunk is not on the
    same card as the window a CopyBits is performed instead.

*******************************************************************************/
short UpdateImage(Rect *chunkRect, IIM_IMG_INFO *image, IMAGE_CHUNK_PTR theChunk)
{
    char            *fn="UpdateImage";
    Rect            windowRect;
    Rect            chunk = *chunkRect;
    Rect            sRect, dRect;
    MyGWorldPtr     windowWorld = GetWindowWorld(image->window);
    Point           origin;
    short           domeID, slot;
    GDHandle        device;
    WDHandle        data;
    Rect            rect;
    UDWORD          zoom, flags = PROC_COPYLUT | PROC_ZOOM | PROC_ZOOMINIT;
    UDWORD          maskMap = 0;
    short           x, y;
    PixMapPtr       pPM;
    SDWORD          factor;
    Point           zoom_pt;
    Rect            cRect;
    Point           pt = (0, 0);

/* If doing a synchronous image copy, vice an asynchronous copy */
    if (gCopySync)
        flags |= PROC_SYNC;

/* Test that we were not told to copy a NULL image */
    if (image == NULL) {
        log_abnormal0("UpdateImage: passed a NULL image info pointer.");
        return(-1);
    }
```

```
/* Make sure we have a valid window to copy the image into */
if (image->window == NULL) {
    log_abnormal0("UpdateImage: the image info pointer a NULL window pointer.");
    return(-1);
}

/* Get a handle to the image's GWorld which describes the bounds of the image */
windowWorld = GetWindowWorld(image->window);
if (windowWorld == NULL) {
    log_abnormal0("UpdateImage: the image info pointer has no world.");
    return(-1);
}

/* If we're operating with virtual memory, make sure the image is loaded */
/* into RAM first                                                        */
if (gVirtualOn)
{
    log_debug1("%s: Virtual memory enabled, testing for loaded image.", fn);
    if (!ImmLoaded(image))
    {
        log_debug1("%s: Need to load image.", fn);
        ImmMarkLoadVirtual(image);
        if (ImmLoadImage(image))
        {
            log_abnormal1("%s: Failed to load image.", fn);
            return(-1);
        }

}
}

/* Get the windows data handle */
    data = (WDHandle)GetWRefCon(image->window);

/* Set the current graphics port */
    SetPort(image->window);

/* Get the windows destination rectangle. This is the rectangle that */
    /* we want the image to be copied into. This rectangle may be larger */
    /* than the window, if so the image will be clipped to fit inside    */
    /* the window.                                                       */
    dRect = (**data).dRect;
    SetRect(&sRect, 0, 0, image->image.cols, image->image.rows);
    windowRect = image->window->portRect;

/* Setup the graphic world's variables for later use */
    (**windowWorld->portPixMap).baseAddr = (Ptr)theChunk->memLink->address;
    (**windowWorld->portPixMap).bounds = *chunkRect;

/* Figure out what graphics device this window is on */
    device = Window2Device(image->window);

/* figure out what slot this graphics device is in */
    slot = Device2Slot(device);
    if ( (IsDomeDevice(device)) && (slot == MAC_ADDR_2_SLOT(theChunk->memLink->address)))
    {
        /* If we want to display an image on a card GetDomeFromSlot(slot, &domeID);
        if (domeID < 0)
            return(-1);

D_SetDevice(domeID);    /* Set the current dome device */

/* set the values of the lookup table */
        SetGrayMap(image);

/* define a temporary bitmap for the copy */
        gDomeInfo[domeID]->current_image = D_DefBitmap(sRect.right+1, sRect.bottom+1, image->image.bits_allocated,
                BIT_HOSTADDR, theChunk->memLink->address, PITCH(image->image.rowbytes));

if ( gDomeInfo[domeID]->current_image == 0)
        {
            log_abnormal1("%s: unable to allocate a bitmap to copy the image", fn);
            return(-1);
        }

/* Setup the original source rectangle that will be modified */
        /* to be the final source rectangle.                         */
        rect = sRect;

/* Do the math for the ProcessRect function. */
        DoProcessMath(image, &rect, &origin, &zoom);

/* Modify the zoom point of the destination rectangle is negative */
        if (dRect.left < 0)
            zoom_pt.h = -dRect.left;
        else
            zoom_pt.h = 0;

if (dRect.top < 0)
            zoom_pt.v = -dRect.top;
        else
            zoom_pt.v = 0;
```

```
/* If not performing a bilinear interpolated zoom, shift the zoom  */
/* point.  This is necessary to compensate for the perceived       */
/* shifting that is generated by the interpolated zoom.            */
if (!gBilinear)
{
    zoom_pt.h += zoom >> 17;
    zoom_pt.v += zoom >> 17;
}
else
    flags |= PROC_BILINEAR;

/* Setup the origin for the zoom, and convert it to monitor coordinated.    */
    origin = zoom_pt;
    D_UnmapPt(&origin, zoom);

/* figure out the factor.  */
    factor = D_PointToXY(zoom_pt);

/* figure out if a mask bitmap is needed or not */
    if (NeedMask(image->window))
    {
        flags |= PROC_MASK;

/* figure out the topleft corner of the device in global    */
        /* coordinates.                                             */
        pPM = *(((CWindowPtr) (image->window))->portPixMap);
        x = pPM->bounds.left + (*device)->gdRect.left;    /* Offsets from local coords to DOME coords */
        y = pPM->bounds.top + (*device)->gdRect.top;
        maskMap = gDomeInfo[domeID]->mask_map;

/* offset the visible region of the window to convert it to */
        /* monitor coordinates.                                     */
        OffsetRgn (image->window->visRgn, -x, -y);

SetPort((GrafPtr)&(mask[domeID]->port));
        ClipRect(&rect);
        SetGDevice(GetMainDevice());

/* Clear the mask bitmap */
        ForeColor(whiteColor);
        PaintRect(&rect);

/* paint the visible region in black, this region will be   */
        /* the one bit deep bitmap that we will be use for the      */
        /* masked copy.                                             */
        ForeColor(blackColor);
        BackColor(whiteColor);
        PaintRgn (image->window->visRgn);

/* convert the visible region back into global coordinates. */
        OffsetRgn (image->window->visRgn, x, y);
    }

SetPort(image->window);

/* obscure the cursor so that it won't punch a hole in the image.   */
    cRect = image->window->portRect;
    LocalToGlobal(&TopLeft(cRect));
    LocalToGlobal(&BotRight(cRect));
    ShieldCursor(&cRect, pt);

/* Do the copy. */
    D_Sync();
    D_ProcessRect( gDomeInfo[domeID]->current_image, SCREEN_BITMAP, maskMap,
                   origin.h, origin.v, rect.left, rect.top,
                   RECT_WIDTH(rect), RECT_HEIGHT(rect), rect.left, rect.top,
                   factor, flags, zoom, 0);

ShowCursor();

/* Free the temporary bitmap.  */
    D_FreeBitmap(gDomeInfo[domeID]->current_image);
}
else
{
    /* PDS does not yet support copying an image from one card to another.  */
    MoveTo(theChunk->bounds.left + 10, theChunk->bounds.top + 50);
    SetPort(image->window);
    ForeColor(whiteColor);
    TextSize(24);
    TextFont(times);
    DrawString("\pInsufficient memory to display image");
    ForeColor(blackColor);
}
return(noErr);
}
```

PseudoCopyBits

```
/*******************************************************************
    The source bitmap must be in DRAM and the destination bitmap must be
    the windows bitmap.
*******************************************************************/
void PseudoCopyBits(UDWORD srcBits, Rect *destRect, Point destTL, Boolean bilinear)
{
    Rect         dest = *destRect;
    Rect         windowRect = THEPORT->portRect;
    IIM_IMG_INFO *image = get_windows_iim(gWindowPort);
    UDWORD       zoom, flags = flags = PROC_COPYLUT | PROC_SYNC | PROC_ZOOM | PROC_ZOOMINIT;
    UDWORD       maskMap = 0;
    Rect         rect;
    Rect         dRect = GetWindowdRect(gWindowPort);
    GDHandle     device = Window2Device(gWindowPort);
    PixMapPtr    pPM;
    short        x, y;
    Point        origin;
    SDWORD       factor;
    Point        zoom_pt;
    Rect         sRect;

if (bilinear)
        flags |= PROC_BILINEAR;

/* Setup the original source rectangle. */
    SetRect(&sRect, 0, 0, GetImageWidth(gWindowPort), GetImageHeight(gWindowPort));

D_SetDevice(gCurrentDomeID);   /* Set the current dome device */

/* setup the lookup table */
    SetGrayMap(image);

/* Setup the original destination rectangle that will be    */
    /* modified to be the final destination rectangle.          */
    rect = *destRect;
    DoProcessMath(image, &rect, &origin, &zoom);

/* figure out if a mask bitmap is needed or not */
    if (NeedMask(gWindowPort))
    {
        flags |= PROC_MASK;

/* figure out the topleft corner of the device in global    */
        /* coordinates.                                             */
        pPM = *(((CWindowPtr) (image->window))->portPixMap);
        x = pPM->bounds.left + (*device)->gdRect.left;    /* Offsets from local coords to DOME coords */
        y = pPM->bounds.top + (*device)->gdRect.top;

maskMap = gDomeInfo[gCurrentDomeID]->mask_map;

/* offset the visible region of the window to convert it to */
        /* monitor coordinates.                                     */
        OffsetRgn (image->window->visRgn, -x, -y);

SetPort((GrafPtr)&(mask[gCurrentDomeID]->port));
        ClipRect(&rect);
        SetGDevice(GetMainDevice());

/* Clear the mask bitmap */
        ForeColor(whiteColor);
        PaintRect(&rect);

/* paint the visible region in black, this region will be  */
        /* the one bit deep bitmap that we will be use for the     */
        /* masked copy.                                            */
        ForeColor(blackColor);
        BackColor(whiteColor);
        PaintRgn (image->window->visRgn);

/* convert the visible region back into global coordinates. */
        OffsetRgn (image->window->visRgn, x, y);
    }

HideCursor();

/* Adjust the zoom point for fractional pixels */
    zoom_pt.h = -dRect.left + destTL.h;
    zoom_pt.v = -dRect.top + destTL.v;
    factor = (zoom_pt.v << 16) + zoom_pt.h;

/* Do the masked copy */
    D_ProcessRect( srcBits, SCREEN_BITMAP, maskMap,
                   origin.h, origin.v, rect.left, rect.top,
                   RECT_WIDTH(rect), RECT_HEIGHT(rect), rect.left, rect.top,
                   factor, flags, zoom, 0);

ShowCursor();
    SetPort(gWindowPort);
}
```

| Function | File | Page | Type |
|---|---|---|---|
|  | Masking Pseudo-code | 1 |  |
| DoProcessMath | Masking Pseudo-code | 1 | void |
| PseudoCopyBits | Masking Pseudo-code | 5 | void |
| UpdateImage | Masking Pseudo-code | 2 | short |

What is claimed is:

1. A method for displaying an image on a display screen comprising the steps of:
receiving an event from a host computer in response to operator input;
determining if an event is an update image event;
determining, when said event is an update image event, a first video display where image data is located in memory and a second video display where a window to be updated is loaded;
preparing a copy command to request that a graphics controller copy the image data from a first video display memory into the memory of a second display; and
sending the copy command to the graphics controller so that the graphics controller copies the image data from a memory of the first video display to a memory of the second video display.

2. The method of claim 1 further comprising the steps of:
determining if there is room in the memory of the second video display to hold the image data; and
removing images from the memory of the second video display to make room in the memory of the second video display for the image data.

3. The method of claim 2 wherein the step of removing images from the memory of the second video display includes the steps of:
determining which images that are stored in the memory of the second display;
determining a priority of the images that are stored in the memory of the second display; and
selecting the images to be removed from the second memory based on the priority of the images.

4. The method of claim 1 further comprising the steps of:
determining a visible region for the window to be updated;
comparing the visible region of the window to be updated to the window to be updated to determine if the window to be updated is equal to the visible region of the window, thus indicating that the entire window to be updated is visible;
generating a mask bit map corresponding the visible region of the window to be updated when the visible region is different than the window; and
passing the mask bit map to the graphics controller to use during copying of the image data to video display memory.

5. The method of claim 4 wherein said visible region is kept calculated by an operating system on the host computer.

6. The method of claim 5 wherein a graphics package on the host computer is a Macintosh graphics package.

7. The method of claim 1 further comprising the steps of:
determining if the first video display is the same video display as the second video display; and
sending an error message to the operator when the first video display and the second video display are different video displays.

8. The method of claim 1 in which the step of preparing a command for the graphics controller further comprise the steps of:
calculating a source rectangle;
determining a zoom factor;
calculating a destination rectangle using the zoom factor and the source rectangle; and
passing the source rectangle and destination rectangle to the graphics processor to use in copying the image data to the video display memory.

9. The method of claim 8 further comprising the steps of:
determining a window rectangle; and
clipping the destination rectangle when the destination rectangle is larger than the source rectangle.

10. The method of claim 1 wherein said off-screen video display memory is dynamic random assess memory on a video display card.

11. The method of claim 1 wherein said on-screen memory is video ram on a video display card.

12. The method of claim 1 wherein the host computer is a Macintosh computer.

13. The method of claim 1 wherein said video display card is a Macintosh Dome Image Display Card.

14. The method of claim 1 further comprising the steps of:
dividing the image data for an image into chunks; and
displaying each chunk on said display so that the chunks form a whole image on the display.

15. The method of claim 14 wherein the image data for an image is divided into chucks when the size of the image is too large to fit on a single video display memory.

16. A method for displaying image data in a window on a computer display screen comprising the steps of:
receiving in an application process running on a host computer, a request to update a window on a computer display screen;
determining a location of the image data in memory;
performing in the application process mathematical calculations on the image data to prepare the image data for handling by a graphics card; and
sending a command from the application process to the graphics card to command the graphics card to copy the image data prepared by the application process to a video card so that the image data appears in the window on the computer display screen.

17. The method of claim 16 further comprising the steps of:
determining the location of the image data on a first video card associated with a first computer display;
identifying a second computer display where the window to be updated is located;
copying the image data to a video random access memory (VRAM) before performing the mathematical calculations; and calling a graphics function resident on the host computer; and copying the image data to the window on the second computer display screen.

18. The method of claim 16 further comprising the steps of determining whether the image data is copied to VRAM before performing the mathematical calculations; and writing an error message to an operator screen.

19. The method of claim 16 further comprising the steps of:

determining whether the image data has been divided into a plurality of sections;

accessing each separate section of image data; and copying each separate section of image data to the window on the computer display screen.

20. The method of claim 16 further comprising the steps of:

determining a source dynamic random access memory (DRAM) from which the image data will be copied;

determining a destination video random access memory (VRAM) to which the image data will be copied;

determining whether the source DRAM and the destination VRAM are on a card;

copying the image data from the source DRAM to a destination DRAM when the source DRAM is on a first card and the destination VRAM is on a second card; and copying the image data from the destination DRAM to the destination VRAM.

* * * * *